United States Patent
Kitamura et al.

(10) Patent No.: US 8,241,584 B2
(45) Date of Patent: Aug. 14, 2012

(54) CATALYST CIRCULATING WASTE PLASTIC/ORGANIC MATTER DECOMPOSITION APPARATUS AND DECOMPOSITION SYSTEM

(75) Inventors: Tatsuo Kitamura, Kusatsu (JP); Yoshihide Kitamura, Kusatsu (JP); Itsushi Kashimoto, Kusatsu (JP)

(73) Assignee: Kusatsu Electric Co., Ltd., Shiga (JP)

( * ) Notice: Subject to any disclaimer, the term of this patent is extended or adjusted under 35 U.S.C. 154(b) by 145 days.

(21) Appl. No.: 12/738,426

(22) PCT Filed: Oct. 20, 2008

(86) PCT No.: PCT/JP2008/068953
§ 371 (c)(1),
(2), (4) Date: Apr. 28, 2010

(87) PCT Pub. No.: WO2009/051253
PCT Pub. Date: Apr. 23, 2009

(65) Prior Publication Data
US 2010/0221158 A1   Sep. 2, 2010

(30) Foreign Application Priority Data

Oct. 19, 2007 (JP) ................. 2007-273216
Nov. 11, 2007 (JP) ................. 2007-292664

(51) Int. Cl.
*B01J 19/18* (2006.01)
*B01J 19/00* (2006.01)
*B01J 8/00* (2006.01)
*B01J 8/08* (2006.01)
*B01J 8/18* (2006.01)
*B01J 8/02* (2006.01)
*B01J 35/02* (2006.01)
*B01J 29/70* (2006.01)
*F27B 15/00* (2006.01)
*F27B 15/08* (2006.01)

(52) U.S. Cl. ........ 422/225; 422/129; 422/139; 422/145; 422/187; 422/198; 422/211; 422/212; 422/213; 422/600; 422/606

(58) Field of Classification Search ............. 422/129, 422/139, 145, 198, 211–213, 224, 225, 600, 422/603, 187; 208/46, 107, 109, 119
See application file for complete search history.

(56) References Cited

U.S. PATENT DOCUMENTS

| | | | |
|---|---|---|---|
| 6,165,349 A * | 12/2000 | Madar ...................... | 208/55 |
| 7,034,198 B2 * | 4/2006 | Osada et al. .............. | 588/19 |
| 2003/0196883 A1 * | 10/2003 | Inoue et al. .............. | 201/25 |
| 2005/0075521 A1 * | 4/2005 | Wada ........................ | 585/241 |

FOREIGN PATENT DOCUMENTS

JP   2004182837 A   *   7/2004

OTHER PUBLICATIONS

Machine translation of JP 2004-182837 A, which was published Jul. 2, 2004.*

* cited by examiner

*Primary Examiner* — Walter D Griffin
*Assistant Examiner* — Natasha Young
(74) *Attorney, Agent, or Firm* — Kilyk & Bowersox, P.L.L.C.

(57) ABSTRACT

A decomposition apparatus and a decomposition system for high-efficiency decomposition of waste plastic and organic matter, in particular medical waste formed of varieties of plastic, are provided by introduction of a catalyst circulating means using a rotary wheel and/or introduction of a mixing vessel.

34 Claims, 18 Drawing Sheets

CATALYST CIRCULATING WASTE PLASTIC/ORGANIC MATTER DECOMPOSITION APPARATUS AND DECOMPOSITION SYSTEM

This application is a National Stage Application of PCT/JP2008/68953, filed Oct. 20, 2008, which claims the priority of Japanese Patent Application No. 2007-273216 and No. 2007-292664, which are incorporated herein by reference.

TECHNICAL FIELD

The present invention relates to a decomposition apparatus for wastes of plastic and organic matter, in particular medical wastes formed various kinds of plastic and organic matter or infectious medical wastes. Specifically, the present invention relates to an apparatus and decomposition system for highly efficient decomposition of waste plastic and organic matter, which are provided by optimizing means for circulation/agitation using a rotary wheel and/or introducing a mixing vessel.

In addition, the decomposition apparatus further includes means for separating and recovering metals and inorganic matter which are mixed in the waste plastics or which, for example, are deposited from the vapor or adheres to at least a portion of the waste plastics.

BACKGROUND OF THE INVENTION

Recently, there have been proposed various methods of treating and recycling waste plastics, and further, parts thereof are practically employed. As a useful method of recycling and reusing such waste plastics, there is proposed a method and apparatus for gasifying the waste plastics by heating chips of the waste plastics in the presence of a decomposition catalyst of titanium oxide known as a photocatalyst under irradiation with ultraviolet light (See Patent Documents 1 and 2).

Further, catalysts used for decomposition treatment of the waste plastics chips have been variously studied (Patent Documents 3 to 5).

However, the decomposition apparatus using the above-mentioned decomposition method of waste plastics cannot conduct efficient decomposition treatment of waste plastics, and large treatment cost and a large apparatus are needed.

Further, the treatment of waste containing polyvinylchloride is known to generate a hydrogen chloride gas. Also, the treatment of Teflon™ is known to generate toxic hydrogen fluorides. The treatment of those kinds of gasses has become a problem.

Plastic and organic matter are difficult to treat on discarding them. Incineration treatment of them raises a danger of generating toxic substances such as dioxin.

In addition, pieces of plastic often contain metals such as aluminum and copper, and inorganic matter, and have metals deposited from the vapor or adhering to their surfaces, depending on their uses. If those pieces of plastic are incinerated, toxic gases may be generated or the incineration furnace may be damaged.

Accordingly, organic matter such as pieces of plastic is treated by landfilling in some cases. As plastics, however, the matter is not decomposed in the ground. In actuality, the availability of landfill sites has become difficult. Although there are biodegradable plastics, they have drawbacks of taking a long period of time until they are decomposed and of need of a very large area for biodegradation. Further, reusable metals, rare metals, and inorganic matter mixed in the waste plastic/organic matter cannot be separated therefrom, and they are simply landfilled or incinerated together with the waste plastic/organic matter.

Further, illegal dumping of industrial waste is a major problem.

There exists a conventional decomposition process for organic matter utilizing a catalyst. According to the existing process, organic matter such as plastics are crushed into granules in a crusher, and then the crushed organic matter is charged into a reaction vessel in drum shape, the reaction vessel containing catalyst granules in advance. After that, agitation blades are rotated in the reaction vessel to agitate the catalyst with the organic matter, while supplying hot air into the reaction vessel using a blower. The work of the catalyst enhances the decomposition of the organic matter, and thus the organic matter is gasified.

Although the catalyst is left behind in the reaction vessel, the gasified organic matter passes through a separator formed mainly of a cyclone dust collector, and only water vapor and carbon dioxide are emitted to the atmosphere as exhaust gases. By the above-mentioned gasification of the organic matter charged into the reaction vessel, new organic matter in an amount corresponding to the amount of the gasified organic matter can be charged into the reaction vessel, thereby allowing the above process to continuously operate without interruption.

The above existing decomposition apparatus, however, cannot conduct efficient decomposition treatment for waste plastics, and large treatment cost and a large apparatus are needed.

Further, the treatment of waste containing polyvinylchloride is known to generate a hydrogen chloride gas and nitrogen compounds. In addition, the treatment of Teflon™ is known to generate toxic hydrogen fluoride. The treatment of those kinds of gases becomes a problem.

In addition, a decomposition apparatus for waste plastics using a screw feeder to circulate a catalyst in a reaction vessel has been also disclosed (Patent Documents 6). However, under catalyst circulation using the screw feeder, the catalyst can wear out because of heavy load placed thereon. As a result of wearing of the catalyst, there is a problem of insufficient decomposition of waste plastics in a reaction vessel. Further, there is another problem of a shortened life span of the catalyst due to hard wearing of the catalyst, causing the need of frequently replacing the catalyst with new one in the reaction vessel. Further, the catalyst has been difficult in handling because of catalyst scattering.

In addition, in the catalyst circulation using a screw feeder, there is a problem of poor agitation efficiency of the catalyst and the waste plastics.

Regarding the prevention of secondary infection caused by infectious medical waste discharged from hospitals, dialysis facilities, and the like, a guideline specifying the treatment method of that kind of waste was issued from the Ministry of Health and Welfare on Nov. 17, 1989, and was enforced on Apr. 1, 1990. The guideline orders the hospitals, dialysis facilities, and the like to conduct in-house sterilization of the medical waste, in principle.

In this regard, there is wanted the development of a decomposition method and a decomposition apparatus for waste plastics, in particular the infectious medical waste containing polyvinylchloride, applicable in hospitals or clinics safely without using a large scale apparatus.

[Patent Document 1] JP-A-2002-363337
[Patent Document 2] JP-A-2004-182837
[Patent Document 3] JP-A-2005-066433
[Patent Document 4] JP-A-2005-205312

[Patent Document 5] JP-A-2005-307007
[Patent Document 6] JP-A-2007-8092

DISCLOSURE OF THE INVENTION

Problems to be Solved by the Invention

The present invention has been derived in view of the above-mentioned circumstances, and an object of the present invention is to provide a decomposition apparatus and a system for a large amount of waste plastic/organic matter efficiently while elongating a catalyst life.

Further, an object of the present invention is to provide an apparatus and a system for efficiently decomposing waste plastic/organic matter, particularly medical waste formed of varieties of plastics, biological substances such as blood, and plastic with the biological substances adhering thereto. More specifically, the object is to provide a decomposition apparatus and a decomposition system which can remove HCl generated during decomposition of chlorine-based plastics such as polyvinylchloride, sulfur compounds and nitrogen compounds generated during decomposition of biological waste and varieties of medical waste plastics, and hydrogen fluoride generated during decomposition of fluorine compounds such as Teflon™, and the like.

Means for Solving the Problems

The inventors of the present invention have established a decomposition apparatus and a system for waste plastic/organic matter, in particular medical wastes of various kinds of plastic by: optimizing means for circulation and agitation in the decomposition apparatus using a rotary wheel; introducing a mixing vessel; and introducing means for adsorbing and removing a generated harmful gas.

Therefore, the present invention has been completed.

That is, the present invention is as follows.

1. A catalyst-circulating type decomposition apparatus for plastic/organic matter, including:
   a circulation vessel in which a catalyst is circulated;
   a rotary wheel installed in the circulation vessel and provided for circulating and/or agitating the plastic and/or organic matter together with the catalyst,
   wherein the plastic and/or organic matter are/is circulated together with the catalyst in the circulation vessel.

2. The catalyst-circulating type decomposition apparatus for plastic/organic matter according to the preceding item 1, wherein the rotary wheel is constructed so that a wheel is arranged on a rotation axis which is revolved by a driving source and the rotation axis passes through the circulation vessel.

3. The catalyst-circulating type decomposition apparatus for plastic/organic matter according to the preceding item 2, wherein the wheel is provided with an agitation blade.

4. The catalyst-circulating type decomposition apparatus for plastic/organic matter according to any one of the preceding items 1 to 3, wherein:
   the circulation vessel is divided into three areas, a right area, a left area, and a middle area, by two partition walls; and
   one or two or more of the rotary wheels are arranged on each of the three areas.

5. The catalyst-circulating type decomposition apparatus for plastic/organic matter according to the preceding item 4, wherein:
   the rotary wheel arranged on the middle area transfers the plastic and/or organic matter together with the catalyst to the right area and/or the left area;
   the rotary wheel arranged on the right area and/or the left area transfers the plastic and/or organic matter together with the catalyst to the middle area; and
   the plastic and/or organic matter together with the catalyst are/is circulated in the circulation vessel.

6. The catalyst-circulating type decomposition apparatus for plastic/organic matter according to the preceding item 4 or 5, wherein:
   the rotary wheel arranged on the right area and/or the left area is located higher than the rotary wheel arranged on the middle area; and
   the catalyst after the completion of the circulation is dropped from the downstream end of the right area and/or the left area to newly supplied plastic and/or organic matter in the circulation vessel.

7. The catalyst-circulating type decomposition apparatus for plastic/organic matter according to any of the preceding items 4 to 6, wherein a mixing vessel is connected to the circulation vessel or introduced into the circulation vessel.

8. The catalyst-circulating type decomposition apparatus for plastic/organic matter according to any one of the preceding items 1 to 3, wherein:
   the circulation vessel is divided into two areas, a forward area and a backward area, by one partition wall;
   one rotary wheel is arranged on the forward area and two rotary wheels are arranged on the backward area;
   the rotary wheel arranged on the forward area transfer the plastic and/or organic matter to the backward area;
   the rotary wheels arranged on the backward area transfer the plastic and/or organic matter together with the catalyst to the forward area; and
   the plastic and/or organic matter are/is circulated together with the catalyst in the circulation vessel.

9. The catalyst-circulating type decomposition apparatus for plastic/organic matter according to any one of the preceding items 1 to 3, wherein the circulation vessel is divided into three areas by two partition walls and one or two or more of the rotary wheels are arranged on each of both end areas.

10. The catalyst-circulating type decomposition apparatus for plastic/organic matter according to any one of the preceding items 1 to 3, wherein:
   the circulation vessel is divided into two or more sections and first to final sections are connected to one another;
   the downstream end of the final section is connected to the upstream end of the first section; and
   one or two or more of the rotary wheels are arranged on each of the sections.

11. The catalyst-circulating type decomposition apparatus for plastic/organic matter according to any one of the preceding items 1 to 3, wherein:
   the circulation vessel is divided into two or more sections and first to final sections are connected to one another;
   the downstream end of the final section is connected to the upstream end of the first section through a mixing vessel; and
   one or two or more of the rotary wheels are arranged on each of the sections.

12. The catalyst-circulating type decomposition apparatus for plastic/organic matter according to the preceding item 10, wherein:
   the rotary wheel arranged on the final section is located higher than the rotary wheel arranged on the previous section being connected to the final section; and
   the catalyst after the completion of the circulation is dropped from the downstream end of the final section to newly supplied plastic and/or organic matter in the circulation vessel.

13. The catalyst-circulating type decomposition apparatus for plastic/organic matter according to the preceding item 11, wherein:

the rotary wheel arranged on the final section is located higher than the rotary wheel arranged on a previous section being connected to the final section; and the catalyst after the completion of the circulation is dropped from the downstream end of the final section to newly supplied plastic and/or organic matter in the mixing vessel.

14. The catalyst-circulating type decomposition apparatus for plastic/organic matter according to any one of the preceding items 7, 11, and 13, wherein:

the mixing vessel includes
agitating means for agitating the plastic and/or organic matter,
an introduction port for introducing the plastic and/or organic matter into the mixing vessel, and
one or two or more catalyst-retaining areas for retaining the catalyst after the completion of circulation;

the catalyst after the completion of the circulation in the catalyst-retaining area is dropped to the plastic and/or organic matter;

the plastic and/or organic matter are/is brought into contact with the catalyst; and the catalyst and the plastic and/or organic matter are transferred to the first section.

15. The catalyst-circulating type decomposition apparatus for plastic/organic matter according to any one of the preceding items 7, 11, 13, and 14, wherein:

the mixing vessel includes
one or two or more catalyst-retaining areas for retaining the catalyst after the completion of circulation,
one or two or more basket storage areas for housing the plastic and/or organic matter,
a transport inlet for carrying a basket into the mixing vessel, and
a transport outlet for carrying the basket out of the mixing vessel;

a basket containing the plastic and/or organic matter is carried into the basket storage area in the mixing vessel through the transport inlet;

the catalyst, after the completion of the circulation in the catalyst-retaining area, is dropped to the basket storage area;

the plastic and/or organic matter are/is brought into contact with the catalyst; and the catalyst is then transferred to the first section.

16. The catalyst-circulating type decomposition apparatus for plastic/organic matter according to the preceding item 15, wherein:

the mixing vessel further includes a basket transfer lane for transferring a plurality of baskets into the mixing vessel; and one or two or more baskets are carried out of the mixing vessel through the transport outlet and simultaneously next one or two or more baskets are carried into the mixing vessel through the transport inlet.

17. The catalyst-circulating type decomposition apparatus for plastic/organic matter according to the preceding item 16, wherein:

a downstream end of the basket transfer lane is connected to an upstream end of the basket transfer lane through the mixing vessel; and additional plastic and/or organic matter to be newly processed are/is charged into the basket being carried out and the basket is then carried into the mixing vessel again.

18. A catalyst-circulating type decomposition apparatus for plastic/organic matter, including:

a circulation vessel in which a catalyst is circulated;
a mixing vessel for mixing the catalyst with the plastic and/or organic matter;
means for circulating and/or agitating the plastic and/or organic matter together with the catalyst (means for circulation and/or agitation) in the circulation vessel;
means for agitating the plastic and/or organic matter in the mixing vessel;
an introduction port in the mixing vessel for introducing the plastic and/or organic matter into the mixing vessel; and
one or two or more catalyst-retaining areas in the mixing vessel for retaining the catalyst after the completion of circulation, wherein:
the catalyst after the completion of the circulation in the catalyst-retaining area is dropped to the plastic and/or organic matter;

the plastic and/or organic matter are/is brought into contact with the catalyst; and the catalyst and the plastic and/or organic matter are then transferred into the circulation vessel.

19. The catalyst-circulating type decomposition apparatus for plastic/organic matter according to the preceding item 18, wherein:

the mixing vessel further includes
one or two or more basket storage areas for housing the plastic and/or organic matter;
a transport inlet for carrying a basket into the mixing vessel; and
a transport outlet for carrying the basket out of the mixing vessel;

a basket containing the plastic and/or organic matter is carried into the basket storage area in the mixing vessel through the transport inlet;

the catalyst after the completion of the circulation in the catalyst-retaining area is dropped to the plastic and/or organic matter;

the plastic and/or organic matter are/is brought into contact with the catalyst; and the catalyst is then transferred into the circulation vessel.

20. A catalyst-circulating type decomposition apparatus for plastic/organic matter, including:

a circulation vessel in which a catalyst is circulated;
a mixing vessel for mixing the catalyst with the plastic and/or organic matter;
means for circulating and/or agitating the plastic and/or organic matter together with the catalyst (means for circulation and/or agitation) in the circulation vessel;
one or two or more basket storage areas for housing the plastic and/or organic matter in the mixing vessel;
a transport inlet in the mixing vessel for carrying a basket into the mixing vessel; and
a transport outlet in the mixing vessel for carrying the basket out of the mixing vessel; and
one or two or more catalyst-retaining areas for retaining the catalyst after the completion of circulation, wherein:
a basket containing the plastic and/or organic matter is carried into the basket storage area in the mixing vessel through the transport inlet;

the catalyst after the completion of the circulation in the catalyst-retaining area is dropped to the plastic and/or organic matter;

the plastic and/or organic matter are/is brought into contact with the catalyst; and the catalyst is then transferred into the circulation vessel.

21. The catalyst-circulating type decomposition apparatus for plastic/organic matter according to the preceding item 20, wherein:
the mixing vessel further includes
agitating means for agitating the plastic and/or organic matter, and
an introduction port for introducing the plastic and/or organic matter into the mixing vessel;
the catalyst after the completion of the circulation in the catalyst-retaining area is dropped to the plastic and/or organic matter;
the plastic and/or organic matter are/is brought into contact with the catalyst; and
the catalyst and the plastic and/or organic matter are transferred to the circulation vessel.

22. The catalyst-circulating type decomposition apparatus for plastic/organic matter according to any one of the preceding items 18 to 21, wherein:
the mixing vessel further includes a basket transfer lane for carrying a plurality of baskets into the mixing vessel; and
one or two or more baskets are carried out of the mixing vessel through the transport outlet and simultaneously next one or two or more baskets are carried into the mixing vessel through the transport inlet.

23. The catalyst-circulating type decomposition apparatus for plastic/organic matter according to the preceding item 22, wherein:
a downstream end of the basket transfer lane is connected to an upstream end of the basket transfer lane through the mixing vessel; and
additional plastic and/or organic matter to be newly processed are/is charged into the basket being carried out and the basket is then transferred into the mixing vessel again.

24. A catalyst-circulating type decomposition apparatus for plastic/organic matter, including:
a circulation vessel in which a catalyst is circulated;
a mixing vessel in which the catalyst is dropped from an downstream end to an upstream end;
means for circulating and/or agitating the catalyst (means for circulation and/or agitation) in the circulation vessel;
one or two or more basket storage areas in the mixing vessel for housing the plastic and/or organic matter;
a transport inlet in the mixing vessel for carrying a basket into the mixing vessel, and
a transport outlet in the mixing vessel for carrying the basket out of the mixing vessel;
wherein:
a basket containing the plastic and/or organic matter is carried into the basket storage area in the mixing vessel through the transport inlet;
the catalyst after the completion of the circulation is dropped to the plastic and/or organic matter;
the plastic and/or organic matter are/is brought into contact with the catalyst; and
the catalyst is then transferred into the circulation vessel.

25. The catalyst-circulating type decomposition apparatus for plastic/organic matter according to the preceding item 24, wherein:
the mixing vessel further includes a basket transfer lane for carrying a plurality of baskets into the mixing vessel; and
one or two or more baskets are carried out of the mixing vessel through the transport outlet and simultaneously next one or two or more baskets are carried into the mixing vessel through the transport inlet.

26. The catalyst-circulating type decomposition apparatus for plastic/organic matter according to the preceding item 25, wherein:
a downstream end of the basket transfer lane is connected to an upstream end of the basket transfer lane through the mixing vessel; and
additional plastic and/or organic matter to be newly processed are/is charged into the basket being carried out and the basket is then carried into the mixing vessel again.

27. The catalyst-circulating type decomposition apparatus for plastic/organic matter according to the preceding item 9, wherein the circulation vessel includes
a transport inlet for carrying a basket into the circulation vessel,
a transport outlet for carrying the basket out of the circulation vessel, and
one or two or more basket storage areas for housing the plastic and/or organic matter in the middle area of the circulation vessel.

28. The catalyst-circulating type decomposition apparatus for plastic/organic matter according to the preceding item 27, wherein:
the circulation vessel further includes a basket transfer lane for carrying a plurality of baskets into the circulation vessel; and
one or two or more baskets are carried out of the circulation vessel through the transport outlet and simultaneously next one or two or more baskets are carried into the circulation vessel through the transport inlet.

29. The catalyst-circulating type decomposition apparatus for plastic/organic matter according to the preceding item 28, wherein:
a downstream end of the basket transfer lane is connected to an upstream end of the basket transfer lane through the circulation vessel; and
additional plastic and/or organic matter to be newly processed are/is charged into the basket being carried out and the basket is then carried into the circulation vessel again.

30. The catalyst-circulating type decomposition apparatus for plastic/organic matter according to any one of the preceding items 7, 11, and 13 to 29, wherein, in the mixing vessel, a carrier gas is supplied from a bottom and/or side of the mixing vessel to fill the mixing vessel with the catalyst.

31. The catalyst-circulating type decomposition apparatus for plastic/organic matter according to any one of the preceding items 1 to 30, wherein, in the circulation vessel, the carrier gas is capable of being directly supplied from a mesh of a wire net on the bottom of the circulation vessel to an inside of the catalyst while being uniformly distributed.

32. The catalyst-circulating type decomposition apparatus for plastic/organic matter according to any one of any one of the preceding items 1 to 31, further including one or more of the following means:
(1) inorganic/metallic catalyst treatment means;
(2) carrier gas supply means;
(3) cyclone dust collection means;
(4) dust collection means with a filter;
(5) heat exchange means;
(6) preheater means;
(7) exhaust means;
(8) cooling means;
(9) heat recovery means;
(10) HCl continuous measurement means;
(11) CO continuous measurement means;
(12) alarm means; and
(13) lime neutralization treatment means.

33. A decomposition system for plastic/organic matter characterized by using the decomposition apparatus according to any one of the preceding items 1 to 32, thereby decomposing the plastic and/or organic matter while controlling a heating temperature of the catalyst formed of titanium oxide granules in which an active ingredient is titanium oxide within a range of 420° C. to 560° C.

34. The decomposition system according to the preceding item 33, wherein titanium oxide as the active ingredient of the titanium oxide granules has the following characteristics:
(1) the granules are almost spherically shaped; and
(2) 70% or more of the entire granules each have a particle size of 0.15 to 1.0 mm.

35. The decomposition system according to the preceding item 34, wherein the titanium oxide granules comprise a mixture of titanium oxide as the active ingredient and at least any one selected from the following compounds:
(1) aluminum oxide; and
(2) silicon oxide.

Effect of the Invention

According to the decomposition apparatus and the decomposition system according to the present invention, when the waste plastic/organic matter is placed in a circulation vessel or a mixing vessel, the waste plastic/organic matter is circulated together with a catalyst in the circulation vessel preferably by a rotary wheel. In this circulation step, since the waste plastic/organic matter is agitated and mixed with the catalyst preferably by the rotary wheel, the contact between the catalyst and the waste plastic/organic matter is repeated, thus keeping the density of the catalyst and the waste plastic/organic matter constant, thereby enhancing efficient decomposition based on the catalyst action. As a result, the waste plastic/organic matter charged into the circulation vessel is gasified until the waste plastic/organic matter makes about a round (one circulation) in the circulation vessel.

Further, in Embodiment 7 described later, two-way catalyst circulation is feasible in the circulation vessel. The two-way catalyst circulation can perform high-efficiency decomposition as a result of enhancing the efficiency of bringing the catalyst into contact with the waste plastic/organic matter in comparison with one-way catalyst circulation with the same capacity as one of the two-way circulation.

In addition, the decomposition apparatus and the decomposition system according to the present invention are each implemented with a mixing vessel independently from a reaction vessel for catalyst circulation, thereby facilitating more efficient decomposition. Further, the decomposition apparatus and the decomposition system of the present invention each include means for oxidation catalyst treatment, and preferably each further include lime neutralization treatment means. Consequently, they can conduct high-efficiency treatment of waste plastic, organic matter, in particular industrial waste such as medical waste formed of varieties of plastic, biological substances such as blood, and plastics with biological substances adhering thereto. Further, they can easily conduct the treatment of plastic which generates HCl, hydrogen fluoride, sulfur compounds, nitrogen compounds, and the like during a decomposition step, of organic matter, of biological substances such as blood, and of fluorine compounds generating hydrogen fluoride.

Further, in the catalyst-circulating type decomposition apparatus for waste plastic/organic matter of the present invention, the use of a rotary wheel can reduce the capacity of the reaction vessel (decomposition vessel) as compared with the conventional decomposition apparatus using a screw feeder even if the same amount of a catalyst is used.

Further, in the catalyst-circulating type decomposition apparatus for waste plastic/organic matter of the present invention, the use of a rotary wheel can extend the life span of a catalyst approximately five to twenty times as long as that in a decomposition apparatus using the conventional screw feeder.

Further, in the catalyst-circulating type decomposition apparatus for waste plastic/organic matter of the present invention, the size of the reaction vessel (decomposition vessel) can be reduced to approximately one third to two fifths of that of a decomposition apparatus using the conventional screw feeder even if the vessels have the same capacity.

Further, in the catalyst-circulating type decomposition apparatus for waste plastic/organic matter of the present invention, the amount of waste plastic/organic matter to be processed can be increased to approximately two or more times as large as that of a decomposition apparatus using the conventional screw feeder even if they use the same amount of the catalyst.

Consequently, the decomposition apparatus of the present invention can attain miniaturization of the decomposition apparatus and high-efficiency decomposition without discharge of a harmful gas to the outside of the decomposition apparatus. Therefore, the decomposition apparatus can be placed on a site, such as a hospital, where waste materials can be generated and the waste materials can be then processed.

BEST MODE FOR CARRYING OUT THE INVENTION

The decomposition apparatus and the decomposition system according to the present invention are described with reference to the attached drawings. Illustrations and descriptions of obvious technologies of a driving source, a blower, a rotary wheel, and so on to be described below may be omitted. In addition, the profile of the decomposition apparatus, the arrangements of the respective components, and scales are illustrated while priority is placed on the convenience of the description. Thus, they may be different from those actually employed.

Embodiment 1

Of Catalyst-Circulating Type Decomposition Apparatus 1 for Waste Plastic/Organic Matter A catalyst-circulating type decomposition apparatus 1 for waste plastic/organic matter according to Embodiment 1 of the present invention, as illustrated in FIGS. 1 and 2, includes at least a circulation vessel 3 in which a catalyst 2 is circulated and a rotary wheel 5 for circulating and/or agitating waste plastic/organic matter 4 to be supplied into the circulation vessel 3 together with the catalyst 2. The apparatus preferably further includes a ventilation blower 7 as means for supplying a carrier gas (air), heating means 8, which supplies heat required for a decomposition reaction, a ventilation chamber 9, and an exhaust port 10.

Here, the circulation vessel 3 of FIG. 2 has a triangular shape and is divided into three sections (a first section 11, a second section 12, and a third section 13 (final section)). The first to final sections are connected to one another and a downstream end 25 of the final section is connected to the upstream end of the first section via the mixing vessel 23. Therefore, the catalyst 2 can circulate in the circulation vessel 3.

One or two or more rotary wheels 5 are installed in each section to transfer the catalyst 2 and the waste plastic and/or organic matter 4 to the subsequent section or to agitate the catalyst 2 and the waste plastic and/or organic matter 4.

Embodiment 2

Of Catalyst-Circulating Type Decomposition Apparatus 1 for Waste Plastic/Organic Matter The catalyst-circulating type decomposition apparatus 1 for waste plastic/organic matter according to Embodiment 2 of the present invention, as illustrated in FIG. 3, includes at least the circulation vessel 3 in which the catalyst 2 is circulated and the rotary wheel 5 for circulating and/or agitating the waste plastic/organic matter 4 to be supplied into the circulation vessel 3 together with the catalyst 2. The apparatus preferably further includes the ventilation blower 7 as means for supplying a carrier gas (air), the heating means 8, which supplies heat required for a decomposition reaction, the ventilation chamber 9, and the exhaust port 10.

Here, the circulation vessel 3 of FIG. 3 has a rectangular shape and is divided into four sections (the first section 11, the second section 12, the third section 13, and a fourth section 14 (final section)). The first to final sections are connected to one another via the mixing vessel 23. Therefore, the catalyst 2 can circulate in the circulation vessel 3.

Like the aforementioned Embodiment 1, one or two or more rotary wheels 5 are installed in each section.

In addition, a paddle 17 is preferably installed to change the flow of the catalyst or prevent a situation where the catalyst 2 and the waste plastic/organic matter 4 cannot move with the flow of the circulation and the catalyst 2 and the waste plastic/organic matter 4 accumulate on the corner of each section. In each embodiment, further, the paddles 17 may be similarly installed in the respective sections.

Embodiment 3

Of Catalyst-Circulating Type Decomposition Apparatus 1 for Waste Plastic/Organic Matter The catalyst-circulating type decomposition apparatus 1 for waste plastic/organic matter according to Embodiment 3 of the present invention, as illustrated in FIG. 4, includes at least the circulation vessel 3 in which the catalyst 2 is circulated and the rotary wheel 5 for circulating and/or agitating the waste plastic/organic matter 4 to be supplied into the circulation vessel 3 together with the catalyst 2. The apparatus preferably further includes the ventilation blower 7 as means for supplying a carrier gas (air), the heating means 8, which supplies heat required for a decomposition reaction, the ventilation chamber 9, and the exhaust port 10.

Here, the circulation vessel 3 of FIG. 4 has a trapezoidal shape and is divided into four sections (the first section 11, the second section 12, the third section 13, and the fourth section 14 (final section)). The first to final sections are connected to one another and the downstream end 25 of the final section is connected to the upstream end of the first section via the mixing vessel 23. Therefore, the catalyst 2 can circulate in the circulation vessel 3. Further, when viewed from the upper side of the circulation vessel 3, the vessel is preferably designed in the form of a trapezoid where the second section serves as an upper side and the fourth section (final section) serves as a bottom side, and the length of the second section is shorter than the length of the fourth section (final section).

Embodiment 4

Of Catalyst-Circulating Type Decomposition Apparatus 1 for Waste Plastic/Organic Matter The catalyst-circulating type decomposition apparatus 1 for waste plastic/organic matter according to Embodiment 4 of the present invention, as illustrated in FIG. 5, includes at least the circulation vessel 3 in which the catalyst 2 is circulated and the rotary wheel 5 for circulating and/or agitating the waste plastic/organic matter 4 to be supplied into the circulation vessel 3 together with the catalyst 2. The apparatus preferably further includes the ventilation blower 7 as means for supplying a carrier gas (air), the heating means 8, which supplies heat required for a decomposition reaction, the ventilation chamber 9, and the exhaust port 10.

Here, the circulation vessel 3 of FIG. 5 has a hexagonal shape and is divided into six sections (the first section 11, the second section 12, the third section 13, the fourth section 14, a fifth section 15, and a sixth section 16 (final section)). The first to final sections are connected to one another and the downstream end 25 of the final section is connected to the upstream end of the first section via the mixing vessel 23. Therefore, the catalyst 2 can circulate in the circulation vessel 3.

In the catalyst-circulating type decomposition apparatus 1 for waste plastic/organic matter according to any other embodiment of the present invention, the above circulation vessel 3 is in the form of a pentagon, an octagon, or a nonagon and divided into five, eight, or nine sections.

Further, a mode in which the circulation vessel 3 is constructed of two rectangular sections connected to each other in parallel is also included in the catalyst-circulating type decomposition apparatus 1 for waste plastic/organic matter of the present invention.

Embodiment 5

Of Catalyst-Circulating Type Decomposition Apparatus 1 for Waste Plastic/Organic Matter The catalyst-circulating type decomposition apparatus 1 for waste plastic/organic matter according to Embodiment 5 of the present invention, as illustrated in FIG. 6, includes at least the circulation vessel 3 in which the catalyst 2 is circulated, two or more rotary wheels 5 for circulating and/agitating the waste plastic/organic matter 4 to be supplied into the circulation vessel 3 together with the catalyst 2, and a partition wall 20 having one or two or more holes. The apparatus preferably further includes the ventilation blower 7 as means for supplying a carrier gas (air), the heating means 8, which supplies heat required for a decomposition reaction, the ventilation chamber 9, and the exhaust port 10.

In the circulation vessel 3 of FIG. 6, two rotary wheels 5 are rotating in different directions via the partition wall 20 having one or two or more holes. Therefore, the catalyst 2 and/or the waste plastic/organic matter 4 lifted by one rotary wheel 5 are/is transferred to the opposite side of the partition wall 20 through the hole. Similarly, the catalyst 2 and/or the waste plastic/organic matter 4 lifted by the other rotary wheel 5 are/is transferred to the opposite side of the partition wall 20 through the hole. Therefore, the catalyst 2 and/or the waste plastic/organic matter 4 lifted by the rotation of the two rotary wheels can circulate in the circulation vessel 3. In particular, the use of the so-called one-sided wheel (see FIG. 8), a single wheel 51 with a plurality of agitation blades 53, allows the catalyst 2 and/or the waste plastic/organic matter 4 accumulating between the agitation blades 53 and the partition wall 20 to pass through the hole so that the catalyst 2 and/or the waste plastic/organic matter 4 may be transferred to the opposite side of the partition wall 20 easily.

In FIGS. 2 to 6 in which the above embodiments are illustrated, the mixing vessel 23 is installed in the catalyst-circulating type decomposition apparatus 1 for waste plastic/organic matter. However, if the mixing vessel 23 is not installed in the catalyst-circulating type decomposition apparatus 1 for waste plastic/organic matter, a slot 6 (see FIG. 1) can be formed in the circulation vessel 3 to introduce the waste plastic/organic matter 4 being pulverized into particles of from several cubic centimeters to several cubic millimeters into the circulation vessel 3 through the slot 6. The slot 6 is preferably formed on the upstream end of the first section. Therefore, the catalyst 2 after the circulation near the downstream end 25 of the final section can be introduced the dropped to the introduced waste plastic/organic matter 4.

In addition, the slot 6 is not only used for the supply of the waste plastic/organic matter 4 but also used as a slot for the catalyst 2.

In each of the embodiments of the catalyst-circulating type decomposition apparatus 1 for waste plastic/organic matter of the present invention, an area 19 inside each of the sections of FIGS. 2 to 5 is available to house apparatuses such as a driving source such as a motor, the heating means 8, the ventilation chamber 9, and a basket transfer lane 601 to be described later. Therefore, the catalyst-circulating type decomposition apparatus for waste plastic/organic matter of the present invention is successfully miniaturized in a remarkable manner.

In the catalyst-circulating type decomposition apparatus for waste plastic/organic matter of the present invention, the use of a rotary wheel allows a reduction in capacity of the reaction vessel (decomposition vessel) compared with that of a decomposition apparatus using the conventional screw feeder even if the same amount of the catalyst is used.

Further, in the catalyst-circulating type decomposition apparatus for waste plastic/organic matter of the present invention, the use of a rotary wheel can extend the life span of the catalyst approximately five to twenty times as long as that in a decomposition apparatus using the conventional screw feeder. This is because the conventional screw feeder has a very large degree of catalyst wear compared with that of the rotary wheel.

Further, in the catalyst-circulating type decomposition apparatus for waste plastic/organic matter of the present invention, the size of the reaction vessel can be reduced to approximately one third to two fifths of that of a conventional catalyst-circulating type decomposition apparatus for waste plastic/organic matter even if the vessels have the same capacity.

(Rotary Wheel)

The rotary wheel 5 is constructed so that a wheel 51 is arranged on a rotation axis 18 which can be revolved by a driving source and the rotation axis 18 passes through the circulation vessel 3. The rotary wheel 5 has a function of transferring the catalyst 2 and/or the waste plastic/organic matter 4 in the circulation direction (toward the subsequent section) of the circulation vessel while agitating the catalyst 2 and/or the waste plastic/organic matter 4 (horizontal transfer function) and a function of transferring from a low position to a high position (vertical transfer function).

As illustrated in FIG. 7, the rotary wheel 5 has a structure, the so-called water-wheel structure, having a plurality of agitation blades 53 between the two wheels 51.

Alternatively, as illustrated in FIG. 8, the rotary wheel 5 may be of the so-called one-sided wheel structure having the plurality of agitation blades 53 on one side of the one wheel 51.

Alternatively, a one-sided wheel structure in which the plurality of agitation blades 53 is arranged on both sides of the one wheel 51 is also permitted. Further, in the one-sided wheel structure, the capacity of the circulation vessel can be reduced. Thus, means for cooling and heating means can be easily installed in the circulation vessel 3.

Preferably, a plurality of holes 52 is installed in the wheel 51. The catalyst 2 and the waste plastic and/or organic matter 4 can be freely moved through the holes 52, leading to an increase in agitation efficiency.

Further, preferably, the wheel 51 and/or the agitation blade 53 may be provided with an auxiliary propeller 54. The auxiliary propeller 54 enables agitation in the direction opposite to the circulation direction of the rotary wheel, and hence it can increase the efficiency of agitation. Further, a projection 55 may be formed on the agitation blade 53. It can prevent the catalyst and the waste plastic/organic matter 4 from forming an agglomeration irrespective of whether the catalyst 2 is in powder form or in particle form.

In FIG. 1, further, the rotation direction of the rotary wheel 5 shows counter clockwise rotation. Obviously, however, the rotary wheel 5 can also rotate in a clockwise direction by changing the rotation direction of the rotation axis 18. Further, the rotation axis 18 is rotated by a driving source such as a motor.

(Mixing Vessel)

The mixing vessel 23 of the present invention can be roughly classified into the following three types:

(A) a mixing vessel including agitating means for agitating waste plastic and/or organic matter, an introduction port for introducing the waste plastic and/or organic matter into the mixing vessel, and one or two or more catalyst-retaining areas for retaining the catalyst after the completion of the circulation thereof (see FIG. 9);

(B) a mixing vessel including one or two or more basket storage areas for housing waste plastic and/or organic matter, a transport inlet for carrying a basket into the mixing vessel, a transport outlet for carrying the basket out of the mixing vessel, and one or two or more catalyst-retaining areas for retaining the catalyst after the completion of the circulation thereof (see FIG. 10); and (C) a mixing vessel having both functions of the above mixing vessels (A) and (B).

Further, a connection tube 234 may be installed on any position to connect the circulation vessel 3 with any of the above mixing vessels 23 (for transporting the catalyst and/or the waste plastic/organic matter).

Further, the mixing vessel 23 may include a basket storage area in a catalyst-retaining area or may form a basket storage area independent from a catalyst-retaining area. In addition, preferably, two or more catalyst-retaining areas are arranged (e.g., a first catalyst-retaining area 240 and a second catalyst-retaining area 241).

Further, preferably, the mixing vessel 23 is provided with a catalyst-introduction port 232 for introducing the catalyst 2 after the completion of the circulation thereof into the mixing vessel 23.

As illustrated in FIG. 9, the mixing vessel 23 of the embodiment of the above (A) according to the present invention includes at least catalyst-retaining areas (the first catalyst-retaining area 240 and the second catalyst-retaining area 241) for retaining the catalyst 2 after circulation, an introduction port 233 for waste plastic/organic matter, which is provided for introducing the waste plastic/organic matter into the mixing vessel, and agitation means 231 for agitating the introduced waste plastic/organic matter.

The agitating means 231 is means (device) for agitating the waste plastic/organic matter together with the catalyst. Thus, the means is not limited to a particular one as long as it is able to agitate the waste plastic/organic matter and the catalyst.

Examples of such agitating means 231 include the above rotary wheel 5 and a screw feeder. In addition, the agitating means 231 is also responsible for feeding both the waste plastic/organic matter 4 and the catalyst 2 after the completion of the agitation to the circulation vessel 3 through the connection tube 234 after sufficiently mixing them.

The catalyst introduction port 232 is responsible for adjusting the amount of the catalyst 2 to be dropped into the waste plastic/organic matter 4. Further, a valve 242 may be provided for adjusting the amount. Further, it is preferred that the catalyst 2 be always housed in the catalyst introduction port 232. The catalyst 2 also serves as a plug to prevent a gas generated in the mixing vessel 23 from being exhausted to the outside.

The introduction port 233 for waste plastic/organic matter may be provided with a screw feeder for pulverizing the waste plastic/organic matter. Alternatively, any means for crushing known in the art may be connected to the mixing vessel 23 or the circulation vessel 3.

Therefore, the mixing vessel 23 of the present invention is a device capable of bringing the catalyst 2 after the circulation (which is not mixed with the waste plastic/organic matter in decomposition) into contact with the waste plastic/organic matter and/or agitating them together. Therefore, the decomposition apparatus 1 having the mixing vessel 23 of the present invention can decompose the waste plastic/organic matter with high efficiency unlike the conventional decomposition apparatus.

As illustrated in FIG. 10, the mixing vessel 23 of the embodiment of the above (B) according to the present invention includes at least catalyst-retaining areas (the first catalyst-retaining area 240 and the second catalyst-retaining area 241) for retaining the catalyst 2 after circulation, one or two or more basket storage areas 235 for housing the waste plastic and/or organic matter, a transport inlet 236 for carrying a basket into the mixing vessel, and a transport outlet 237 for carrying the basket out of the mixing vessel.

Further, the transport inlet 236 for carrying a basket into the mixing vessel may also serve as a transport outlet 237 for carrying the basket out of the mixing vessel.

Further, a chute 239 for transporting (sliding down) the catalyst 2 into the circulation vessel 3 may be installed. In addition, the chute 239 may be provided with the agitation means 231.

Therefore, the mixing vessel 23 of the present invention is a device capable of processing waste plastic/organic matter, such as solid waste materials and waste materials attached with metals, and more specifically experimental animals without pretreatment. Further, the mixing vessel 23 of the present invention is a device capable of bringing the catalyst 2 after the circulation (which is not mixed with the waste plastic/organic matter in decomposition) into contact with the experimental animals or the like and/or agitating them together. Therefore, the decomposition apparatus 1 having the mixing vessel 23 of the present invention can decompose the untreated experimental animals or the like nearly completely at low temperatures compared with the conventional decomposition apparatus.

As illustrated in FIG. 11, the mixing vessel 23 of the embodiment of the above (C) according to the present invention has the functions of both the mixing vessels 23 of the above (A) and (B).

Therefore, it is a mixing vessel having the advantages of both the above (A) and (B).

The waste plastic and/or organic matter to be supplied to the mixing vessel 23 of any of the above (A) to (C) of the present invention preferably contain/contains at least a waste plastic material. The waste plastic material can cause an exothermal reaction by contacting with a catalyst to allow the inner temperatures of the circulation vessel 3 and the mixing vessel 23 to be kept at an optimal catalyst activation temperature. Therefore, it becomes possible to keep them within an optimal catalyst activation temperature range without requiring the sequential supply of heat from the outside.

Further, a net 605 for controlling the amount of the catalyst to be supplied is preferably a wire net, allowing the catalyst 2 to be uniformly supplied (flowed down) from the upstream end to the downstream end. Preferably, the net 605 includes two or more wire nets, and hence the supply (amount of flow) of the catalyst can be controlled by sliding the plurality of wire nets across each other. Alternatively, the amount of the catalyst to be supplied may be controlled with a slide gate or the like. In addition, the catalyst 2 may be partially supplied to the inner surface of the reaction vessel instead of being supplied to the entire inner surface thereof as illustrated in FIGS. 9 to 12. Further, means 238 for supplying a carrier gas from the bottom and/or side of the mixing vessel 23 and from around the catalyst introduction port may be installed in the mixing vessel. The supply of a carrier gas, preferably an atmospheric gas, from the bottom and/or side of the mixing vessel and from around the catalyst introduction port fills the mixing vessel with the catalyst, thereby increasing the efficiency of bringing the waste plastic and/or organic matter into contact with the catalyst.

(Basket Transfer Lane)

As illustrated in FIG. 12, the mixing vessel 23 of each the above (B) and (C) of the present invention is preferably provided with a basket transfer lane 601 for transferring a plurality of baskets 602 into the mixing vessel. In addition, the transport inlet 236 for carrying the basket 602 into the mixing vessel and the transport outlet 237 for carrying the basket out of the mixing vessel may be formed of two-step shutters, respectively, to prevent a thermal source in the mixing vessel from being released therefrom when the basket 602 is carried into the mixing vessel.

Further, the basket transfer lane 601 may be preferably covered with a known insulating material to prevent the thermal source from being released to the outside. The driving source for the basket 602 on the basket transfer lane 601 may be, but not specifically limited to, a belt conveyor or the like.

In addition, the basket 602 may be preferably a wire net. The basket 602 is a net allowing the catalyst 2 being flowing down to pass therethrough, while preventing metal/inorganic matter, which is being mixed with the waste plastic material or deposited from the vapor or attached on at least part thereof, from passing therethrough. Further, any means for rotating and/or vibrating the basket 602 in the mixing vessel 23 may be installed to make the catalyst 2 and the waste plastic/organic matter 4 contact each other efficiently.

Consequently, one or two or more baskets 602 can be carried out of the mixing vessel through the transport outlet 237 and simultaneously the next one or two or more baskets can be carried into the mixing vessel 23 through the transport inlet 236.

As illustrated in FIG. 13, the basket transfer lane 601 is arranged so that the downstream end 604 thereof is connected to the upstream end 603 thereof through the mixing vessel 23.

Thus, additional waste plastic and/or organic matter to be newly processed are/is placed in the basket being carried out and the basket is then carried into the mixing vessel 23 again, allowing the waste plastic/organic matter to be decomposed. Here, the flow of baskets being transported is represented by the arrow 606. Alternatively, the baskets may flow in the reverse direction.

Therefore, in the catalyst-circulating type decomposition apparatus 1 for waste plastic/organic matter 1 in which the basket transfer lane of the present invention is installed, the supply of additional waste plastic/organic matter to be newly processed into the basket leads to semi-automatic decomposition of the waste plastic/organic matter 4.

Further, the basket transfer lane 601 may be arranged on the inner area 19 of each section.

(Process for Dropping Catalyst after Circulation)

The rotary wheel 5 installed in the final section of the above circulation vessel is located higher than the rotary wheel 5 installed in the previous section being connected to the final section. Thus, the catalyst after the completion of the circulation can be dropped onto the newly supplied waste plastic and/or organic matter in the circulation vessel or the mixing vessel from the downstream end of the final section. More specifically, the catalyst can be sprinkled.

Further, preferably, the rotary wheel 5 installed in each section is located higher than the rotary wheel 5 installed in the previous section being connected thereto. Thus, the final section is arranged higher than the first section.

In particular, the waste plastic/organic matter 4 immediately after being supplied may cause a harmful gas when it is heated before being mixed with the catalyst 2. One of the characteristic features of the decomposition apparatus of the present invention is to allow the waste plastic/organic matter 4 immediately after supplying to be quickly mixed with the catalyst 2 to significantly prevent the generation of a harmful gas and/or to efficiently decompose the waste plastic/organic matter 4. As illustrated in FIG. 11 and FIG. 12, another characteristic feature of the decomposition apparatus of the present invention is to embed the waste plastic/organic matter 4 in the basket into the layer of the catalyst 2. More specifically, the basket containing the waste plastic/organic matter 4 is carried into the layer of the catalyst 2. Then, the catalyst after the completion of the circulation is dropped onto a basket which is not embedded, or specifically sprinkled thereon to completely embed the basket containing the waste plastic/organic matter 4 into the layer of the catalyst 2. Therefore, the decomposition apparatus of the present invention can perform efficient, almost complete decomposition of an experimental animal, such as a rat, which has been difficult to be completely decomposed in the prior art, while avoiding the generation of a harmful gas.

(Another Embodiment of Catalyst-Circulating Type Decomposition Apparatus 1 for Waste Plastic/Organic Matter)

A catalyst-circulating type decomposition apparatus 1 for waste plastic/organic matter according to another embodiment of the present invention includes at least: the circulation vessel 3 in which the catalyst 2 is circulated; one of the mixing vessels 23 of the above (A) to (C); and means for circulating and/or agitating the waste plastic and/or organic matter together with the catalyst (means for circulation and/or agitation) in the circulation vessel.

Here, the means for circulation and/or agitation 701 (see FIG. 14) is not specifically limited as long as it has a function of transferring the catalyst and/or the waste plastic/organic matter 4 in the circulation direction (toward the subsequent section) of the circulation vessel while agitating the catalyst and/or the waste plastic/organic matter 4 (horizontal transfer function) and a function of transferring from a low position to a high position (vertical transfer function). Examples of such means include: a screw feeder; a conveyor, in particular a packet conveyor; a paddle; a piston; and the above rotary wheel 5. However, the packet conveyer and the above rotary wheel 5 are preferable in consideration of a reduction in wear of the catalyst 2 and agitation efficiency.

(Another Embodiment of Catalyst-Circulating Type Decomposition Apparatus 1 for Waste Plastic/Organic Matter)

The catalyst-circulating type decomposition apparatus 1 for waste plastic/organic matter according to another embodiment of the present invention, as illustrated in FIG. 14, includes: the circulation vessel 3 in which the catalyst 2 is circulated; the mixing vessel 23 in which the catalyst is dropped from the upstream end 702 to the downstream end 703; means for circulating and/or agitating the catalyst (means 701 for circulation and/or agitation) in the circulation vessel; one or two or more of the basket storage areas 235 for housing the waste plastic and/or organic matter in the mixing vessel; the transport inlet 236 for carrying a basket into the mixing vessel; and the transport outlet 237 for carrying the basket out of the mixing vessel. The catalyst-circulating type decomposition apparatus has such a feature that: a basket containing the waste plastic and/or organic matter is carried into the basket storage area 235 in the mixing vessel through the transport inlet 236; the catalyst after the completion of the circulation is dropped to the waste plastic and/or organic matter; the waste plastic and/or organic matter are/is brought into contact with the catalyst 2; and the catalyst 2 is then transferred into the circulation vessel.

Embodiment 6

Of Catalyst-Circulating Type Decomposition Apparatus 1 for Waste Plastic/Organic Matter In the catalyst-circulating type decomposition apparatus 1 for waste plastic/organic matter according to Embodiment 6 of the present invention, as illustrated in FIG. 15, the circulation vessel 3 is divided into three areas (two both end areas 801 opposite to each other and a middle area 802) by each of the two partition walls 20. One or two or more of the rotary wheels 5 are arranged on the two both end areas 801.

The apparatus preferably further includes the ventilation blower 7 as means for supplying a carrier gas (air), the heating means 8, which supplies heat required for a decomposition reaction, the ventilation chamber 9, and the exhaust port 10.

The partition wall 20 may have one or two or more holes. As a result, the catalyst 2 and/or the waste plastic/organic matter 4 lifted by the one rotary wheel 5 are/is transferred to the middle area 802 on the opposite side of the partition wall 20 through the hole. Similarly, the catalyst 2 and/or the waste plastic/organic matter 4 lifted by the other rotary wheel 5 are/is transferred to the middle area 802 on the opposite side of the partition wall 20 through the hole. Therefore, the catalyst 2 and/or the waste plastic/organic matter 4 can be circulated in the circulation vessel 3 by the rotation of those two rotary wheels. In particular, the use of the so-called one-sided wheel (see FIG. 8) with the plurality of agitation blades 53 on the one wheel 51 allows the catalyst 2 and/or the waste plastic/organic matter 4 accumulated between the agitation blades 53 and the partition wall 20 to pass through the hole so that the catalyst 2 and/or the waste plastic/organic matter 4 may be transferred to the middle area 802 on the opposite side of the partition wall 20 easily.

Further, the two rotary wheels 5 lift the catalyst 2 and/or the waste plastic/organic matter 4 and simultaneously transfer the catalyst 2 and/or the waste plastic/organic matter 4 in the direction almost perpendicular to the partition wall. This is a function of horizontally discharging the catalyst with respect to the rotation direction of the rotary wheel 5. Therefore, the catalyst 2 and/or waste plastic/organic matter 4 exceed the partition wall so that the catalyst 2 and/or waste plastic/organic matter 4 may be transferred to the middle area 802. Further, un-pulverized solid industrial waste materials or the like can be directly supplied to the middle area 802.

Further, as illustrated in FIG. 16, the circulation vessel 3 includes: the transport inlet 236 for carrying a basket into the circulation vessel; the transport outlet 237 for carrying the basket out of the circulation vessel; and one or two or more of the basket storage areas 235 for housing the waste plastic and/or organic matter in the middle area 802 of the circulation vessel.

In addition, the circulation vessel 3 includes the basket transfer lane 601 for transferring a plurality of baskets into the circulation vessel. In addition, the downstream end 604 of the basket transfer lane 601 may be connected to the upstream end 603 thereof through the circulation vessel 3.

A characteristic feature of the decomposition apparatus of the above embodiment is to embed the waste plastic/organic matter 4 in the basket into the layer of the catalyst 2 in the middle area 802. More specifically, the basket containing the waste plastic/organic matter 4 is transferred into the layer of the catalyst 2. Then, the catalyst 2 being lifted by the rotation of the rotary wheel 5 is dropped onto a basket which is not embedded, or specifically sprinkled thereon to completely embed the basket containing the waste plastic/organic matter 4 into the layer of the catalyst 2.

Embodiment 7

Of Catalyst-Circulating Type Decomposition Apparatus 1 for Waste Plastic/Organic Matter In the catalyst-circulating type decomposition apparatus 1 for waste plastic/organic matter according to Embodiment 7 of the present invention, as illustrated in FIG. 17, the circulation vessel 3 is divided into three areas (right area 901, left area 903, and a middle area 902) by the two partition walls 20. One or two or more rotary wheels 5 are arranged on each of the three areas (the right area 901, the left area 903, and the middle area 902). The two rotary wheels 5 are preferably installed on each area.

The apparatus preferably further includes the ventilation blower 7 as means for supplying a carrier gas (air), the heating means 8, which supplies heat required for a decomposition reaction, the ventilation chamber 9, and the exhaust port 10.

The partition wall 20 may have one or two or more holes. As a result, the catalyst 2 and/or the waste plastic/organic matter 4 lifted by the rotary wheel 5-2 of the middle area 902 are/is transferred to the right area 901 and left area 903 on the opposite side of the partition wall 20 through the hole.

Similarly, the catalyst 2 and/or the waste plastic/organic matter 4 lifted by the rotary wheels 5-4 and 5-6 are/is transferred to the middle area 902 on the opposite side of the partition wall 20 through the hole. It should be noted that the rotary wheels 5-1, 5-3, and 5-5 transfer the catalyst 2 and/or the waste plastic/organic matter 4 in their rotation direction. Therefore, the catalyst 2 and/or the waste plastic/organic matter 4 can be circulated in the circulation vessel 3 by the rotation of those six rotary wheels.

In particular, the use of the so-called one-sided wheel (see FIG. 8) with the plurality of agitation blades 53 on the one wheel 51 allows the catalyst 2 and/or the waste plastic/organic matter 4 accumulated between the agitation blades 53 and the partition wall 20 to pass through the hole so that the catalyst 2 and/or the waste plastic/organic matter 4 may be transferred to the middle area 902, the right area 901, or the left area 903 to the opposite side of the partition wall 20 easily.

Further, the six rotary wheels 5 lift the catalyst 2 and/or the waste plastic/organic matter 4 and simultaneously transfer the catalyst 2 and/or the waste plastic/organic matter 4 in the direction almost perpendicular to the partition wall. This is a function of horizontally discharging the catalyst 2 and/or the waste plastic/organic matter 4 with respect to the rotation direction of the rotary wheel 5.

It should be noted that, in this example, two-way catalyst circulation in the circulation vessel 3 can be nearly attained (see a flow 906 of the catalyst and/or the waste plastic/organic matter in FIG. 17). The two-way catalyst circulation can enhance the efficiency of bringing the catalyst 2 into contact with the waste plastic/organic matter 4 in comparison with one-way catalyst circulation with the same capacity as one of the two-way circulation. Therefore, high-efficiency decomposition of the waste plastic/organic matter can be attained.

In addition, the rotary wheels 5 arranged on the right area 901 and/or the left area 903 are located higher than the rotary wheel 5 on the middle area 902. As a result, the catalyst 2 after the completion of the circulation can be dropped from the downstream end 904 on the right area and/or the left area to the newly supplied waste plastic and/or organic matter 4 in the circulation vessel 3.

Further, as illustrated in FIG. 18, when the rotation directions of the respective rotary wheels are each inverted in a suitable manner, the circulation direction of the catalyst 2 can be made opposite to one illustrated in FIG. 17.

The circulation direction of the catalyst 2 illustrated in FIG. 17 is such that the catalyst 2 can be dropped from two directions to the upper surface of the supplied waste plastic/organic matter 4. Thus, contact efficiency between the catalyst 2 and the waste plastic/organic matter 4 can be increased in comparison with the circulation direction of the catalyst 2 illustrated in FIG. 18.

Further, as illustrated in FIG. 19, the circulation vessel 3 may include means 905 for auxiliary agitation, one or two or more of the basket storage areas 235 for housing the waste plastic and/or organic matter, the transport inlet 236 for carrying a basket into a mixing vessel, and the transport outlet 237 for carrying the basket out of the mixing vessel. Further, any one of a screw feeder, a conveyor, in particular a packet conveyor, a paddle, a piston, and the above rotary wheel 5 can be used as the means 905 for auxiliary agitation.

In addition, as illustrated in FIG. 20, the mixing vessel 23 may be connected or introduced into the circulation vessel 3. Further, the basket transfer lane 601 as described above may be connected to the mixing vessel 23.

Embodiment 8

Of Catalyst-Circulating Type Decomposition Apparatus 1 for Waste Plastic/Organic Matter In the catalyst-circulating type decomposition apparatus 1 for waste plastic/organic matter according Embodiment 8 of the present invention, as illustrated in FIG. 21, the circulation vessel 3 is divided into two areas (a forward area 1001 and a backward area 1002) by one partition wall 20. Then, one or two or more of the rotary wheels 5 are arranged on each of the two areas (the forward area 1001 and the backward area 1002). Further, preferably, the one rotary wheel 5 is arranged on the forward area 1001 and the two rotary wheels 5 are arranged on the backward area 1002.

The apparatus preferably further includes the ventilation blower 7 as means for supplying a carrier gas (air), the heating means 8, which supplies heat required for a decomposition reaction, the ventilation chamber 9, and the exhaust port 10.

The partition wall 20 may have one or two or more holes. As a result, the catalyst 2 and/or the waste plastic/organic matter 4 lifted by the rotary wheel 5-7 of the forward area 1001 are/is transferred to the backward area 1002 on the opposite side of the partition wall 20 through the hole.

Similarly, the catalyst 2 and/or the waste plastic/organic matter 4 lifted by the rotary wheel 5-9 are/is transferred to the forward area 1001 on the opposite side of the partition wall 20 through the hole. It should be noted that the rotary wheel 5-8 transfers the catalyst 2 in its rotation direction.

Therefore, the catalyst 2 and/or the waste plastic/organic matter 4 can be circulated in the circulation vessel 3 by the rotation of those three rotary wheels. In particular, the use of the so-called one-sided wheel (see FIG. 8) with the plurality of agitation blades 53 on the one wheel 51 allows the catalyst 2 and/or the waste plastic/organic matter 4 accumulated between the agitation blades 53 and the partition wall 20 to pass through the hole so that the catalyst 2 and/or the waste plastic/organic matter 4 may be transferred to the forward area 1001 or the backward area 1002 the opposite side of the partition wall 20 easily.

Further, the three rotary wheels 5 lift the catalyst 2 and/or the waste plastic/organic matter 4 and simultaneously transfer the catalyst 2 and/or waste plastic/organic matter 4 in the direction almost perpendicular to the partition wall. This is a function of horizontally discharging the catalyst 2 and/or the waste plastic/organic matter 4 with respect to the rotation direction of the rotary wheel.

In addition, preferably, the rotary wheel 5-7 of the forward area 1001 is made of a one-sided wheel, thereby forming a space in the reaction vessel. One or two or more of the basket storage areas 235 for housing the waste plastic and/or organic matter can be placed in the space.

Further, means 21 for separating and collecting a metal and/or inorganic matter to be described below can be arranged on the downstream end 1003 of the forward area 1001.

(Means for Separating and Collecting Metal and/or Inorganic Matter)

Means 21 for separating and collecting a metal and/or inorganic matter (see FIG. 2 and FIG. 21) can be installed in the catalyst-circulating type decomposition apparatus for waste plastic/organic matter of any of the above examples. The means 21 for separation/collection may be provided with a wire net 211 with a mesh of allowing the maximum diameter of the catalyst 2 to pass therethrough. The wire net 211 may be fit into any of the circulation vessel 3 and the mixing vessel 23. Preferably, however, the wire net 211 may be fit into the vicinity of the downstream end of the final section of the circulation vessel 3, or the vicinity of a connecting pipe 234. Then, a pocket 212 which can collect the metal/inorganic material trapped by the wire net 211 is connected to the wire net. Here, the wire net 211 is designed to be located higher than the pocket 212 (providing an inclined plane between the wire net and the pocket), and hence the metal/inorganic matter being trapped on the wire net can be slid down by its own weight into the pocket 212. Alternatively, the wire net 211 is vibrated with a motor or the like to drop the metal/inorganic material trapped on the wire net to the pocket 212, thereby recovering the metal/inorganic matter.

Further, the pocket 212 is formed of a two-stage shutter, and hence the metal/inorganic matter can be recovered at any time during circulation. However, the metal/inorganic matter may be collected from the pocket 212 when the metal/inorganic matter is accumulated to some extent.

Therefore, in the present invention, there is no need of stopping means for circulation and/or agitation (rotary wheel 5) when the means for separating and recovering a metal and/or inorganic matter separates and collects the metal/inorganic matter from the pocket 212. Thus, the yield of the waste plastic/organic matter can be kept high. Besides, there is no need of opening the circulation vessel 3 or the mixing vessel 23 when the metal/inorganic matter is sorted by the means for separation/recovery. Accordingly, the thermal efficiency of each of the decomposition apparatus and the decomposition system can be kept high. Obviously, after the opening of the circulation vessel 3 or the mixing vessel 23, the metal and/or the inorganic matter can be separated and recovered.

In addition, when an expensive metal is intermingled in the waste plastic/organic matter 4, a slot 22 for taking out a metal/inorganic matter (see FIG. 2) may be used for the way of efficiently collecting the metal. For example, the waste plastic/organic matter 4 in which the expensive metal is intermingled is supplied into the circulation vessel 3 or the mixing vessel 23 while being placed in a wire net (the size thereof is enough to allow the catalyst 2 to pass) in a shape (for example, a cube or a polyhedron) which does not prevent the circulation of the catalyst.

Although the waste plastic/organic matter 4 in the wire net can be evaporated in the process of circulation in the circulation vessel, an un-evaporated metal remains in the wire net. The metal of such shape can be directly collected from a slot 22 for taking out a metal/inorganic matter. Therefore, the metal remaining in the spherical wire net can be efficiently recovered.

Further, in contrast to the above case, if the diameter of the metal to be recovered is smaller than the diameter of the catalyst 2, it is preferred to place a wire net as the means 21 for separating and recovering the metal and/or inorganic matter in any section of the circulation vessel 3 or the mixing vessel 23. A metal collecting vessel may be placed under the wire net to automatically recover the metal separated from the waste plastic/organic matter 4. Further, a mixture containing the metal and/or inorganic matter to be recovered, the catalyst 2, and the waste plastic/organic matter 4 may be temporally taken out of the circulation and then separated by a force of wind, a specific gravity, and a magnetic force. As a result, the catalyst 2 and the waste plastic/organic matter 4 excluding the metal are returned to the flow of circulation.

In addition, the waste plastic/organic matter with the attached metal or inorganic matter is placed in the basket 602. Then, if the decomposition process is carried out in the mixing vessel 23, then the basket 602 is carried out of the mixing vessel 23. As a result, only the metal/inorganic matter remains in the basket 602, and hence the metal/inorganic matter can be easily collected.

As described above, the decomposition apparatus of the present invention can provide an excellent method of separating and recovering the metal and/or the inorganic matter.

(Details of Catalyst-Circulating Type Decomposition Apparatus for Waste Plastic/Organic Matter)

As illustrated in FIG. 1, an air-permeable bottom material 24 of the decomposition apparatus 1 according to the present invention is a metal mesh. The metal mesh is made of a material that can receive the catalyst 2 and permits gaseous passage. However, the air-permeable bottom material is not restricted to the metal mesh.

The heating means 8 of any of the above catalyst-circulating type decomposition apparatuses 1 for waste plastic/organic matter is provided for heating a carrier gas supplied from means for supplying a carrier gas such as the ventilation blower 7. In other words, the heating means 8 performs a function of heating the catalyst up to a catalyst activation temperature required for a decomposition reaction by heating the carrier gas in the process of feeding the carrier gas supplied from the ventilation blower or the like into the ventilation chamber 9. The heat source may be preferably electricity, but not specifically limited thereto.

Further, a heater or the like may be used for directly heating the inside of the circulation vessel. In this case, the electric quantity for the heating can be suppressed to about ½ to ⅓ as compared with the above heating means.

In addition, the ventilation chamber 9 is responsible for two functions, i.e., the so-called carrier gas supplying vessel and a chamber that supplies heat required at the initial stage of a reaction. Further, since a plurality of holes is present in the air-permeable bottom member 24, the presence of the ventilation chamber 9 allows the carrier gas supplied from the ventilation blower 7 or the like to be uniformly distributed and supplied into the entire catalyst.

(Additional Means for Catalyst-Circulating Type Decomposition Apparatus for Waste Plastic/Organic Matter)

Further, the catalyst-circulating type decomposition apparatus 1 for waste plastic/organic matter of the present invention is preferably provided with one of the following means:
(1) inorganic/metallic catalyst treatment means;
(2) carrier gas supply means;
(3) cyclone dust collection means;
(4) dust collection means with a filter;
(5) heat exchange means;
(6) preheater means;
(7) exhaust means;
(8) cooling means;
(9) heat recovery means;
(10) HCl continuous measurement means;
(11) CO continuous measurement means;
(12) alarm means 111; and
(13) lime neutralization treatment means.

(1) Inorganic/Metallic Catalyst Treatment Means

The "inorganic/metallic catalyst treatment means" is preferably introduced into the waste plastic decomposition apparatus of the present invention before the oxidation catalyst treatment step. The inorganic/metallic catalyst treatment means prevents the adhesion of Si, Mg, Cr, Pb, Fe, and the like, or dust or the like to the oxidation catalyst. An alumina catalyst is preferably used as the inorganic/metallic catalyst.

It should be noted that the alumina catalyst is preferably positioned before the oxidation catalyst vessel. An alumina catalyst vessel may be installed separately. It should be noted that the heating temperature of the alumina catalyst is preferably 350° C. or above.

(2) Carrier Gas Supply Means

The carrier gas supplied to the circulation vessel and/or the mixing vessel is preferably oxygen. Normally, however, air is used. Alternatively, an inert gas may be used as needed. The method of supplying the carrier gas involves distributing and supplying the carrier gas uniformly into the catalyst with the ventilation blower and the like. The supply rate is preferably 1.3 to 4.0 times the as large as theoretically required oxygen amount in terms of air at normal temperature containing oxygen in an amount necessary for the oxidation and decomposition of the decomposing organic matter. From the point of decomposition efficiency, the rate is more preferably 1.6 to 3.0 times as large as the amount. It should be noted that, although the blower and the like can be used, the tools are not specifically limited to them.

Here, in the decomposition apparatus of the present invention, a carrier gas, preferably air, is directly supplied into the circulating catalyst being from the mesh of the wire net on the bottom of the circulation vessel. Thus, efficiency of decomposition can be significantly increased as compared to that in a conventional method of supplying a carrier gas from the upper part of a reaction vessel. Here, the use of a precise mesh structure for the wire net leads to the uniform supply of the carrier gas into the catalyst.

Dust Collection Means

The dust collection means of the present invention recovers a metal/inorganic matter and/or a catalyst discharged and scattered from the circulation vessel 3. In addition, the recovered catalyst 2 can be reused. Further, preferably two dust collection means exist to sandwich the lime neutralization treatment means. Further, the first dust collection means is preferably a cyclone dust collection means (apparatus), and the second dust collection means is preferably dust collection means (apparatus) equipped with a filter.

(3) Cyclone Dust Collection Means (First Dust Collection Means)

The catalyst recovered by the first dust collection means is collected by a cyclone, and then is recycled to the circulation vessel through the circulation passage connected to the circulation vessel. As a result, the catalyst utilized for the catalyst circulation. The inventors of the present invention have confirmed, by an experiment, that the first dust collection means recovers about 95% to about 99% of the catalyst.

(4) Dust Collection Means with Filter (Second Dust Collection Means)

If the catalyst recovered by the second dust collection means is fine powder, the fine powder catalyst can be returned to the circulation vessel after the formation of the catalyst to dumplings of a desired size.

(5) Heat Exchange Means

The heat exchange means is means for recovering heat from hot air containing carbon dioxide and a trace amount of water through heat exchange. The obtained heat source can be utilized in the heating means, though the uses thereof are not specifically limited thereto. For example, the uses thereof include the heating of supplied air, the supply to a preheater, and the supply to hot water in the plant facilities, or to snow melting.

(6) Preheater Means

Before the oxidation catalyst treatment, preheating (preliminarily heat holding) is preferably performed with heater means. The preheating is suitable for causing the oxidation catalyst to surely react in the case of: the flow of a low concentration gas; or low heat generation in the decomposition vessel. A heater is preferably used.

(7) Exhaust Means

The exhaust means is means for discharging air containing a safe carbon dioxide gas and a trace amount of water, which is generated by the decomposition of the waste plastic/organic matter, to the outside of the decomposition apparatus for waste plastic/organic matter of the present invention. An exhaust blower is preferably used.

(8) Cooling Means

The cooling means is means for cooling the catalyst in the circulation vessel when the temperature in the circulation vessel exceeds the optimum activation temperature range of the catalyst. The cooling method is suitably a method involving flowing cooling water through the external or internal of the circulation vessel to recover the heat from the circulation vessel (preferably using latent heat or heating the cooling water). However, the cooling method is not specifically limited thereto, and the cooling water may be introduced into a blade or the like.

(9) Heat Recovery Means

The heat recovery means is means for holding or utilizing the heat obtained from the above-described cooling water. The recovered heat can be used in hot-water supply in the plant facilities or in melting snow. The uses of the recovered heat are, however, not limited to those given above.

(10) HCl Continuous Measurement Means

The HCl continuous measurement means is means for confirming whether HCl is absorbed and removed by the lime neutralization treatment means. That is, the means prevents a specified concentration or more of HCl from being emitted to the outside of the decomposition apparatus for waste plastic/organic matter of the present invention.

(11) CO Continuous Measurement Means

The CO continuous measurement means is means for confirming whether the oxidation catalyst treatment means converts CO into carbon dioxide. That is, the means prevents a specified concentration or more of CO from being emitted to the outside of the decomposition apparatus for waste plastic/organic matter of the present invention.

(12) Alarm Means

Although the decomposition apparatus of the present invention conducts safe operation conforming to the legal regulations, the apparatus includes alarm means for notifying if the safe zone is overridden even to a slight degree, the overriding, and automatic operation-stopping means. That is, the apparatus can include means for notifying abnormality when a CO or HCl concentration above the standard level even to a slight degree is detected during the measurement in the HCl continuous measurement means and/or the CO continuous measurement means described above. Preferably, in case of abnormality detection, toxic gases are not emitted to the outside of the apparatus using safety means (apparatus).

Decomposition System for Waste Plastic/Organic Matter of the Present Invention

The decomposition system for waste plastic/organic matter of the present invention means that waste plastic/organic matter is decomposed using any of the above decomposition apparatuses, and further, a preferable catalyst and/or a preferable decomposition condition.

The "heating temperature of the catalyst" of the present invention is at least 300° C. or above and 600° C. or below, preferably 350° C. or above and 600° C. or below, specifically preferably 420° C. to 560° C., more preferably 450° C. to 530° C., and most preferably about 480° C.

It should be noted that the heating temperature is the catalyst temperature in the circulation vessel and/or the mixing vessel to cause the catalyst and the waste plastic and/or the organic matter to react with each other, and is the set temperature to keep the set temperature of the catalyst. That is, even when the set temperature is 480° C., the range of fluctuation of the catalyst temperature in the circulation vessel and the mixing vessel becomes about 30° C. higher or lower than the set temperature.

Further, at a certain position in the circulation vessel, the temperature may become higher or lower than the specifically preferred "heating temperature of the catalyst" of the present invention depending on the shape and size of the circulation vessel. Since, however, the catalyst is circulating in the circulation vessel, most part of the catalyst has only to maintain the specifically preferred heating temperature of the catalyst.

The catalyst of the present invention is preferably one made of titanium oxide granules containing titanium oxide as an active ingredient. The catalyst formed of the titanium oxide granules is not limited to the titanium oxide granules made only of titanium oxide as the active ingredient, and granules of a mixture of titanium oxide with at least one kind chosen from aluminum oxide and silicon oxide (hereinafter also referred to as "titanium oxide mixture") are also permitted. As already known, since titanium oxide has a function as a photocatalyst, the decomposition of the waste plastic/organic matter using any of the above-described catalysts may be conducted, as needed, by heating and agitating the catalyst and the waste plastic/organic matter while applying light, specifically applying ultraviolet light. However, for the case of decomposition of a single article of varieties of waste plastic and organic matter, or decomposition of varieties of materials containing their solid or liquid, or containing metals or inorganic matter, the application of ultraviolet light achieves little effect in terms of practical application.

However, the decomposition apparatus and the decomposition system of the present invention allow high-efficiency decomposition of the waste plastic/organic matter without requiring light irradiation by the use of a rotary wheel, by the introduction of a mixing vessel separately from the reaction vessel for circulating the catalyst, and by the use of a suitable catalyst. Further, the apparatus and the system can almost completely decompose the experimental animals and the like.

The shape of the titanium oxide granules used in the decomposition apparatus or decomposition system for waste plastic of the present invention is preferably a spherical shape, and the particle sizes thereof are 3.5 mesh (5.60 mm) or smaller, and preferably 10 mesh (1.70 mm) or smaller.

The particle sizes of the titanium oxide granules before use range from 5.60 mm to 110 µm, or preferably from 3.50 mm to 150 µm.

As described above, the "catalyst formed of the titanium oxide granules" of the present invention is the titanium oxide granules or granules of a mixture of titanium oxide, has a shape of 3.5 mesh (5.60 mm) or smaller, preferably 10 mesh (1.70 mm) or smaller, and has an abrasion rate of 2.0% or less, preferably 1.0% or less after edge-treatment. As a result, the present invention allows the waste plastic/organic matter to be decomposed with high efficiency over a long period of time by using the above-described catalyst.

In addition, the "catalyst formed of the titanium oxide granules" of the present invention has a specific surface area of titanium oxide as the active ingredient of 30 $m^2/g$ or more, preferably 33 $m^2/g$ or more and 65 $m^2/g$ or less, and more preferably 35 $m^2/g$ or more and 50 $m^2/g$ or less. Also, the specific surface area of the catalyst formed of the titanium oxide granules before use is 35 $m^2/g$ or more and 50 $m^2/g$ of less. A larger specific surface area increases the contact area with the waste plastic, and hence can increase the decomposition efficiency. However, an excessively large specific surface area deteriorates the heat resistance, and likely to collapse the granule to lead to powdering.

Any one of the known methods can be used as a method of determining the specific surface area of the catalyst formed of the titanium oxide granules. In the present invention, a BET method is used for the measurement More preferably, the "catalyst formed of the titanium oxide granules" of the present invention is approximately circular and the "particle sizes" of the granules are 0.15 to 1.0 mm, preferably 0.2 to 0.9 mm, or more preferably 0.20 to 0.80 mm.

More specifically, 70% or more, preferably 80% or more, or more preferably 90% or more of the whole titanium oxide granules before use have particle sizes of 0.15 to 0.90 mm, preferably 0.20 to 0.80 mm, or more preferably 0.20 to 0.80 mm.

In addition, 70% or more, preferably 80% or more, or more preferably 90% or more of the whole titanium oxide granules before use are 0.20 to 0.90 mm, preferably 0.25 to 0.80 mm, or more preferably 0.30 to 0.80 mm in center distribution of particle size.

In addition, "the granules are almost spherically shaped" of the present invention means that the surface edge of a granule (particle) is smoothed and the degree of sphericity of the shape of each particle is high as compared with the shape of the conventional titanium oxide catalyst.

Further, for example, when the waste plastics to be treated are various medical waste plastics such as polyvinyl chloride, polyurethane, and Teflon™, hydrogen chloride, sulfur compounds, hydrogen fluoride, a cyan gas, nitrogen-containing compounds are generated in the treatment process. Hydrogen chloride and the like cannot be emitted into the atmosphere as they are. Therefore, "lime naturalization treatment means" is introduced.

The lime neutralization treatment means is to adsorb and remove hydrogen chloride, sulfur compounds, hydrogen fluoride, a cyan gas, nitrogen-containing compounds, and the like generated in the decomposition treatment step so that they may not be emitted into the atmosphere. The lime neutralization treatment means is means (apparatus) for adsorbing and removing those so as to not emit them into the atmosphere.

Specifically, the means is a lime material formed mainly of quicklime, slaked lime, or a mixture thereof. It is preferred that the lime material be molded into porous pellets of a hydrogen chloride absorber each having a size of 2 mm or larger. Then, the prepared pellet is packed in a removal vessel. The gasses containing decomposed waste plastics-originated hydrogen chloride and the like are brought to pass through the removal vessel, thus allowing hydrogen chloride and the like to react and absorb into the pellets.

The lime material according to the present invention may be mainly formed of quicklime, slaked lime, or a mixture thereof. It is preferred that the lime material be molded into porous pellets each having a size of 2 mm or larger.

Further, the heating temperature of the lime material in the lime neutralization treatment step is preferably from 150° C. to 500° C., more preferably from 200° C. to 400° C., or most preferably from 250° C. to 350° C.

For the lime neutralization treatment means, a lime neutralization treatment apparatus is suitably employed. Utilized in the lime neutralization treatment apparatus is a packed vessel. The pellets drop from the top of the packed vessel toward the bottom thereof. Meanwhile, the gas to be treated flows from the bottom to the top while contacting the lime pellets. A pellet-stock portion is located at the upper portion of the packed vessel, and a discharge portion for the used pellets is located at the lower portion of the packed vessel. The packed vessel is of course isolated from the layer of the reaction vessel by a shutter, a rotary valve, or the like. The apparatus is used with its discharge rate controlled depending on the treatment concentration and the treatment rate. The apparatus is provided with a heater to prevent a deliquescence phenomenon. In the decomposition method, no deliquescence phenomenon appears because the treatment is conducted at a high temperature. Nevertheless, a heating step is preferably provided to respond to a non-heating state.

Further, "oxidation catalyst treatment means" may be introduced into the decomposition apparatus for waste plastic/organic matter of the present invention.

The oxidation catalyst treatment means is provided because the waste plastic or organic matter decomposed by the above-described heated catalyst of the titanium oxide granules may not be perfectly decomposed, and there is a possibility that the non-reacting matter and intermediate products leave the reaction vessel as they are. Thus, in the present invention, the succeeding oxidation catalyst treatment step is preferably conducted for further oxidation or reduction. The oxidation catalyst treatment means is preferably given after the lime neutralization treatment means.

The oxidation catalyst generally initiates oxidation and decomposition reactions at a lower temperature and within a shorter time than those in the case of non-catalytic reactions. There are varieties of conventionally known oxidation catalysts of that type, and they are commercially available. Generally, the reaction temperature to be adopted is in the range of 200° C. to 500° C. In the present invention, however, a reaction temperature of 300° C. or above, or preferably 350° C. or higher is adopted. That is because, for the case of decomposition of varieties of waste plastic/organic matter, the generated non-decomposed gas is not necessarily a single substance. Therefore, a reaction temperature of 350° C. or higher is preferred to completely decompose mixed non-decomposed gases. In terms of efficiency and effectiveness of the apparatus, a honeycomb type catalyst is preferred in the present invention.

It is preferred to conduct a pre-heating treatment (previous heat retention) before the catalyst treatment in order to treat the oxidation catalyst surely when a gas having a low concentration flows thereinto, or the heat generation at the decomposition vessel is low.

The oxidation catalyst affects considerably the oxidation of non-combustion substances such as carbon monoxide and hydrocarbons. With oxygen and at a certain temperature, almost all the substances are immediately oxidized to decompose. Carbon monoxide becomes carbon dioxide, and hydrocarbons become carbon dioxide and water.

Further, "inorganic/metallic catalyst treatment means or suitably alumina catalyst treatment means" is preferably introduced into the decomposition apparatus for waste plastic of the present invention before the oxidation catalyst treatment step. The alumina catalyst treatment means prevents the adhesion of Si, Mg, Cr, Pb, Fe, and the like, or dust or the like to the oxidation catalyst. The alumina catalyst is preferably positioned before the oxidation catalyst vessel. An alumina catalyst vessel may be installed separately. The heating temperature of the alumina catalyst is preferably 350° C. or above.

As described above, the present invention can combine: the oxidation and decomposition by titanium oxide; the removal of hydrogen chloride, hydrogen fluoride, sulfur compounds, nitrogen-containing compounds, and the like using the lime neutralization treatment; the removal of dust and the like by the alumina catalyst treatment; and/or further oxidation and decomposition by an oxidation catalyst.

The waste plastic/organic matter applicable to the decomposition apparatus or decomposition system of the present invention are not specifically limited. In addition, to the general-purpose thermoplastic plastics such as polyethylene and polypropylene, the thermosetting plastics can be decomposed and gasified by the method of the present invention. Although the waste plastic/organic matter are preferably crushed to several cubic millimeters in view of decomposition efficiency, they may also be decomposed without crushing.

It should be noted that the materials which can be decomposed by the decomposition apparatus or decomposition system for waste plastic/organic matter of the present invention are not specifically limited to organic matter, and examples of these applicable materials include: plastics including polyethylene, polypropylene, polyester, polyethylene terephthalate, polystyrene, polycarbonate, polyurethane, polyvinyl chloride, and Teflon; diapers; artificial dialyzers; anticancer drugs; animals; treated articles relating to gene research, in particular light-emitting microorganisms; information-relating device terminals; confidential information-relating devices (such as a CD-R); waste plastics generated from automobiles and household electric appliances; valuable metal recovery; and separation of organic matter from metals and inorganic matter. Further, in the case of medical waste, metals such as stainless steel and aluminum may be mixed into the waste, or the waste may be deposited from the vapor or adhere to the surface of a metal depending on the use of the medical waste. The waste plastic is not limited to the plastic used, but refers to non-used but unnecessary plastic/organic matter.

The present invention is described below with reference to examples, but the present invention is not limited thereto.

Example 1

The following examples describe the process for processing any of medical wastes, such as used injectors, packaging bags, and medical bottles, discarded from hospitals and so on, using means for processing waste plastic/organic matter of the decomposition apparatus of the present invention. Components corresponding to those described above are successively designated by the same names or the same reference numerals.

The catalyst-circulation type decomposition apparatus for waste plastic/organic matter of each of Embodiment 4 and Embodiment 7 was used.

The catalyst 2 was dropped into the circulation vessel 3 and the air was then supplied into the circulation vessel 3 by the ventilation blower 7. Next, the heating means 8 was started to heat the air and the heated air (hot wind) was then supplied into the circulation vessel 3 to heat the catalyst 2 up to 420° C. to 560° C.

Subsequently, the medical waste of several cubic millimeters in size was dropped from the slot 6 into the circulation vessel 3. The dropped medical waste was then circulated together with the catalyst 2 in the circulation vessel 3 by the rotary wheel 5. In the circulation process, the catalyst 2 and the medical waste were continuously agitated by the agitation blade 53, and hence were repeatedly brought into contact with each other. Due to the action of the catalyst 2, the decomposition of the waste plastic/organic matter 4 in the medical waste was facilitated. Consequently, the waste plastic/organic matter 4 in the entire medical waste dropped into the circulation vessel 3 was evaporated during the circulation process of the catalyst. During the evaporation process of the waste plastic/organic matter 4, the generation of a gas mainly including carbon dioxide and water vapor occurred along with the decomposition of the waste plastic/organic matter 4.

The above gas (evaporated organic matter) was treated by being fed to the lime neutralization treatment means and subsequently the oxidation catalyst treatment means.

Further, in the above circulation process, the waste plastic/organic matter 4 that occupied most medical waste is evaporated, while metals mixed in the medical wastes can remain in the catalyst 2 even after the circulation. Such metals may be sorted by a further circulation process with the catalyst 2. For example, the wire net 211 with a mesh of allowing the maximum diameter of the catalyst 2 to pass therethrough, which serves as means for separating and recovering a metal and/or inorganic matter, may be fit into any section of the circulation vessel 3. Then, the pocket 212 which can collect the metal/inorganic material trapped by the wire net is arranged. As a result, the metal/inorganic matter can be recovered from the pocket.

Therefore, according to the decomposition apparatus of the present invention, residual metal and inorganic matter in the environmental and industrial waste materials are hardly found in the circulation vessel 3, and hence the metal can be prevented from oxidation and the recycling thereof can be realized. In addition, there is no need of stopping the rotary wheel 5 when the means for separating and collecting a metal and/or inorganic matter sorts metals. Thus, the high throughput of the medical waste can be retained. In addition, when the means 21 for separating and recovering a metal and/or inorganic matter sorts metals, there is no need of opening the door of the circulation vessel 3. Thus, the thermal efficiency of the means for processing the waste plastic/organic matter can be kept high.

Example 2

Decomposition System for Waste Plastic/Organic Matter of the Present Invention

The decomposition apparatus of Embodiment 4 as described above {with the mixing vessel of the above (B)} was used and the granules of titanium oxide in the circulation vessel were then heated to a temperature of 420° C. to 560° C.

Here, the characteristic features of titanium oxide as the active ingredient of the titanium oxide granules used were (1) a specific surface area of 35 $m^2/g$ or more and 50 $m^2/g$ or less, and (2) a granular body size of 3.5 meshes (5.60 mm) or less.

Here, the waste plastic/organic matter used is a rat (about 560 g in weight) used in the experiment.

The rat was housed in a basket and then introduced into a mixing vessel. Then, the catalyst in the circulation vessel was circulated for about 2 hours and the basket was then carried out. The gas (evaporated organic matter) generated from the catalyst circulation was treated by being fed to the lime neutralization treatment means and subsequently the oxidation catalyst treatment means.

The concentration of the gas after the oxidation catalyst treatment means was compared with that before the catalyst circulation.

Further, it was confirmed whether a protein was attached to the catalyst after the circulation.

(Confirmation of Recovered Rat)

In the recovered basket, there were cinereous cranium, femur, humerus, and vertebra of the rat. However, the hairs, skin, and muscles of the rat were completely decomposed to disappear.

Therefore, an increase in catalyst amount may lead to nearly complete degradation/disappearance of the cranium, femur, humerus, and vertebra of the rat within a short time.

(Confirmation of Gas Concentration after Oxidation Catalyst Treatment Means)

The concentration of the gas after the oxidation catalyst treatment means and the concentration of the gas before the catalyst circulation were measured by gas chromatography. The measurement results were listed in Table 1 below.

As is evident from Table 1 below, no substantial change in each gas concentration was observed before and after the circulation. That is, the decomposition apparatus of the present invention can decompose waste plastic/organic matter without emitting harmful gases such as $NO_x$, $SO_2$, and CO into the environment.

TABLE 1

| Gas concentration before circulation | |
|---|---|
| NOx | 0.5 ppm |
| SO$_2$ | 3.4 ppm |
| CO | 1.7 ppm |
| CO$_2$ | 0.24% |
| O$_2$ | 20.61% |
| Gas concentration after circulation | |
| NOx | 0.6 ppm |
| SO$_2$ | 2.2 ppm |
| CO | 0.4 ppm |
| CO$_2$ | 0.07% |
| O$_2$ | 20.83% |

(Confirmation of Protein Attached to Catalyst after Circulation)

To 500 g of the catalyst after the above circulation, 500 ml of distilled water was added. Then, the catalyst was agitated and washed, and ultrasonically washed for 5 hours. Then, the resultant was left at rest. Subsequently, a supernatant was recovered {pH 2.0, OD (A280 nm, 0.002)}. Then, 250 ml of the recovered supernatant was dialyzed with a 20 mM Tris-HCl buffer (pH 8.0) and a dialysate was obtained.

The above dialysate was used for protein quantification. The protein quantification assay is as described below.

Protein quantification assay: Test-tube micro assay 2.5 to 25 µg/ml

To 800 µl of a test solution in a test tube, 200 µl of a CBB solution (Nacalai Tesque protein quantification reagent) was added, and the mixture was sufficiently agitated, followed by being left standing for 10 minutes. Next, within one hour, absorbance (595 nm) was measured using a reagent blank as a control (measured after zero-point compensation (with the reagent blank (0.002)).

The measurement results are listed in Table 2 below.

As is evident from Table 2 below, the concentration of the protein detected in the sample was substantially zero, or not more than 2.5 µg per ml.

TABLE 2

| sample | Measured value |
|---|---|
| Sample 1 | −0.001 |
| Sample 2 | 0.004 |
| Sample 3 | 0.004 |
| Sample 4 | −0.004 |
| Sample 5 | −0.004 |

To a DEAE column, 40 ml of a washed solution after the above dialysis was added. After elution with a salt concentration of 0 to 0.4 moles, protein analysis was performed.

No protein peak was detected in unabsorbed and absorbed fractions.

Centrifugal separation was performed by adding ammonium sulfide (0 to 70% saturation) to 50 ml of the washing solution after the above dialysis. Although no precipitated fraction was observed, the supernatant was discarded and then the remainder was washed with 1.0 ml of a 20 mM Tris-HCl buffer (pH 8.0). Subsequently, the washed solution was recovered and the protein quantification assay (UV OD A280 nm) was performed after the dialysis.

However, no protein could be detected.

From the above results, it is considered that the proteins existing in the body of the rat were almost completely decomposed to disappear.

Example 3

Decomposition System 2 for Waste Plastic/Organic Matter of the Present Invention The same experiment was performed in a manner similar to that of Example 2 described above except that the decomposition apparatus (with a basket storage area) of Embodiment 7 described above was used and the following granules of titanium oxide were used.

The characteristic features of titanium oxide as an active ingredient of the granules of titanium oxide used were such that (1) of the granules were almost spherically shaped (2) 70% or more of the whole granules each had a particle size of 0.15 to 1.0 mm.

Like the results of Example 2, no protein could be detected. In other words, it is considered that the proteins existing in the body of the rat were almost completely decomposed to disappear.

Compared with the conventional decomposition method, the decomposition system of the present invention shows significantly high decomposition efficiency. Further, with the lime neutralization treatment step using the lime neutralization means and with the oxidation catalyst treatment step using the oxidation catalyst treatment means, the treatment of plastic/organic matter generating HCl, hydrogen fluoride, sulfur compounds, nitrogen compounds, and the like in the decomposition step, of biological substances such as blood or organic, and of fluorine compounds generating hydrogen fluoride can be easily conducted.

All the examples of the present invention described above may be carried out in modes after the application of varieties of improvements, modifications, and changes on the basis of the knowledge of the persons skilled in the art within a range not to depart from the scope of the present invention.

INDUSTRIAL APPLICABILITY

The decomposition apparatus and the decomposition system of the present invention are each a useful technology for treating all kinds of waste including plastic as well as medical waste.

DESCRIPTION OF SYMBOLS

Figure 1:
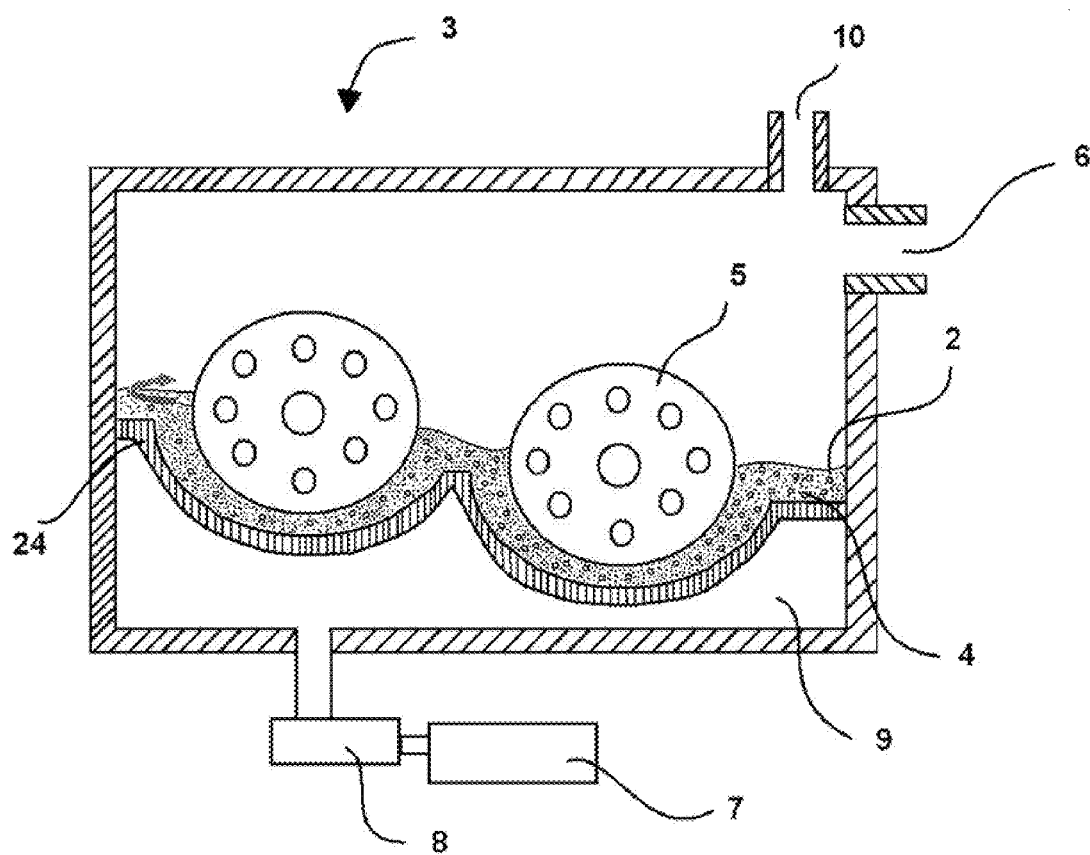
FIG. 1 is a cross-sectional view of a catalyst-circulating type apparatus for waste plastic/organic matter.
Figure 2:
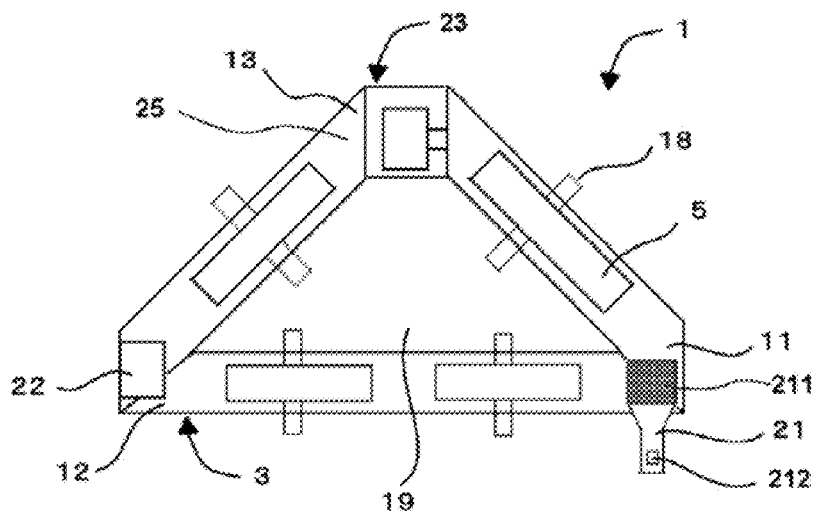
FIG. 2 is a top view of the apparatus according to Embodiment 1 of the present invention.
Figure 3:
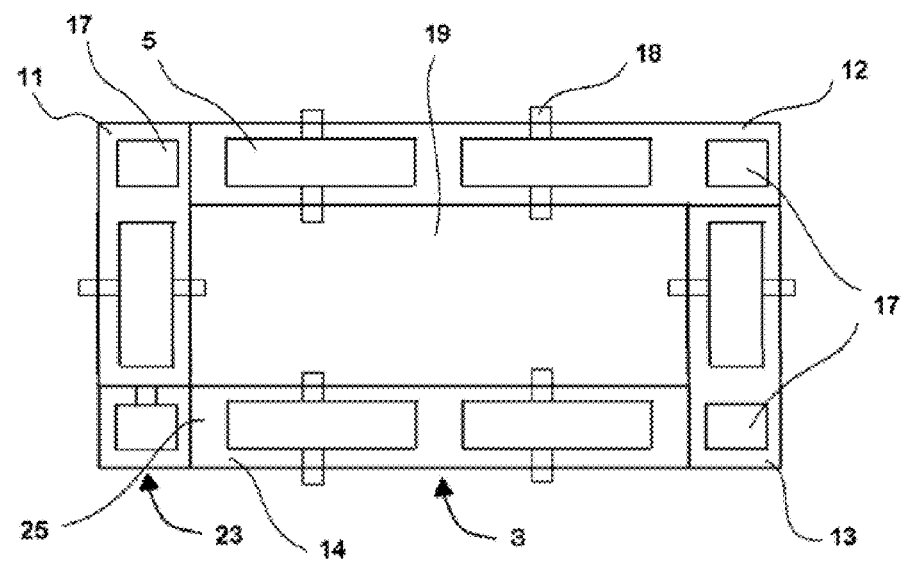
FIG. 3 is a top view of the apparatus according to Embodiment 2 of the present invention.
Figure 4:
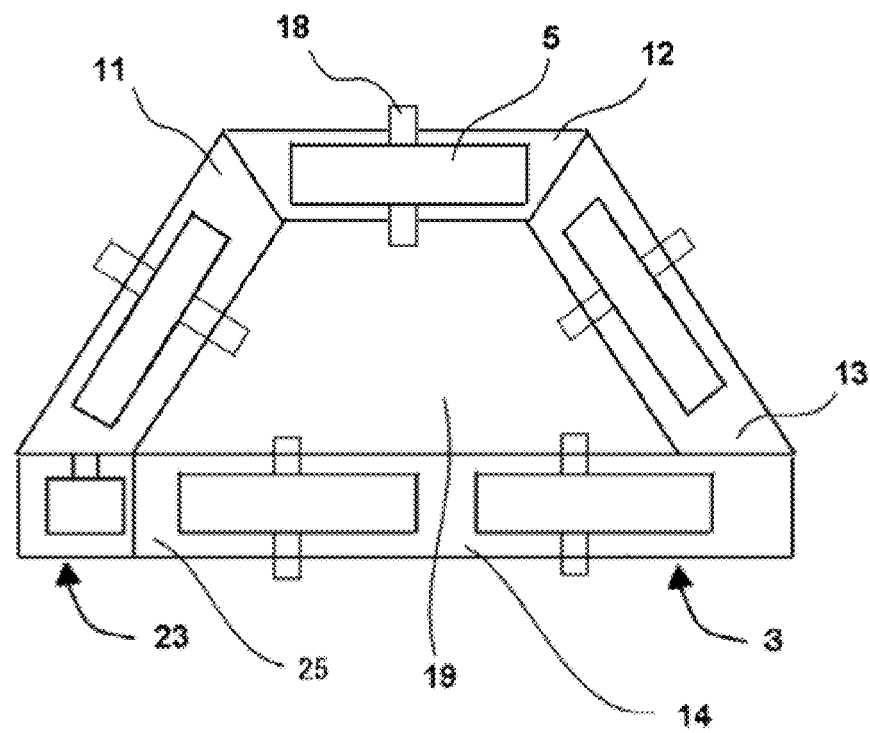
FIG. 4 is a top view of the apparatus according to Embodiment 3 of the present invention.
Figure 5:
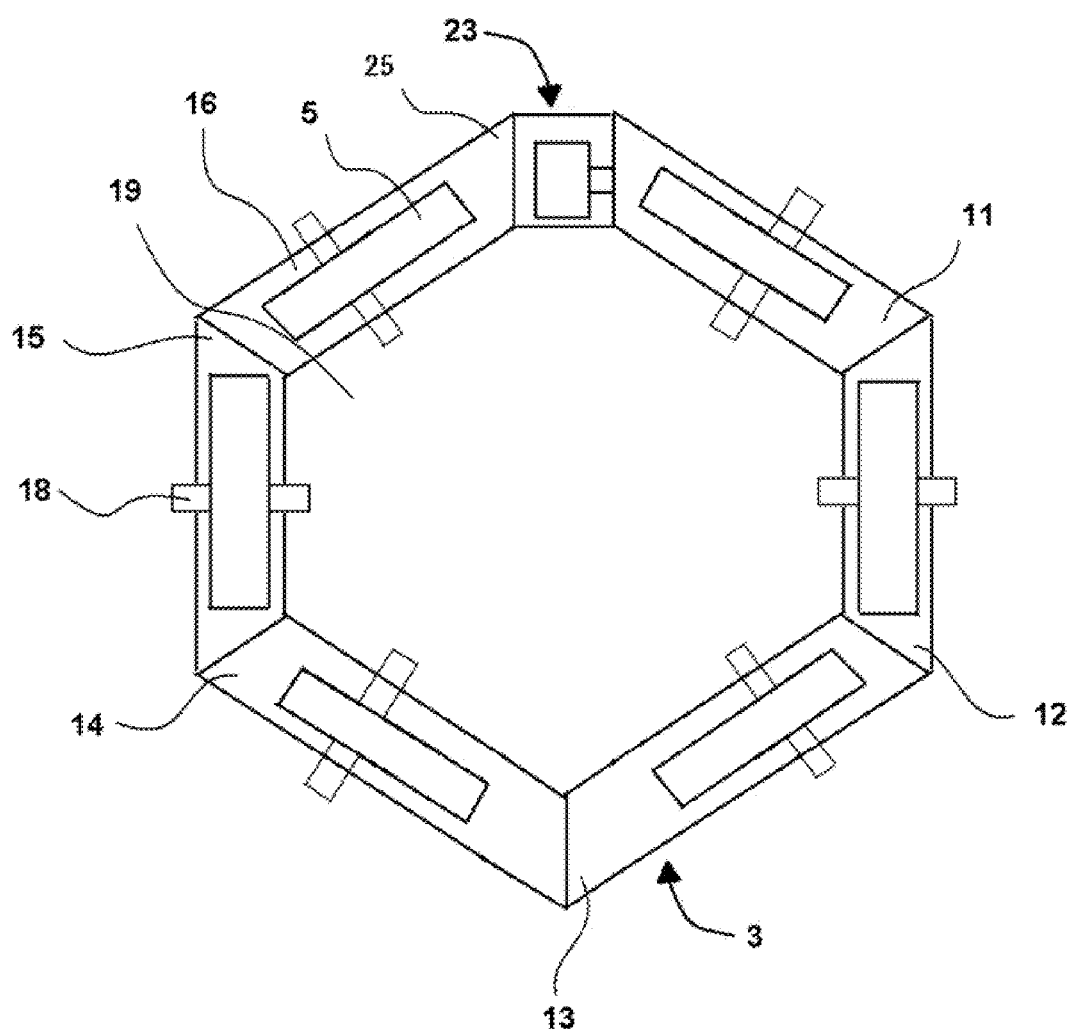
FIG. 5 is a top view of the apparatus according to Embodiment 4 of the present invention.
Figure 6:
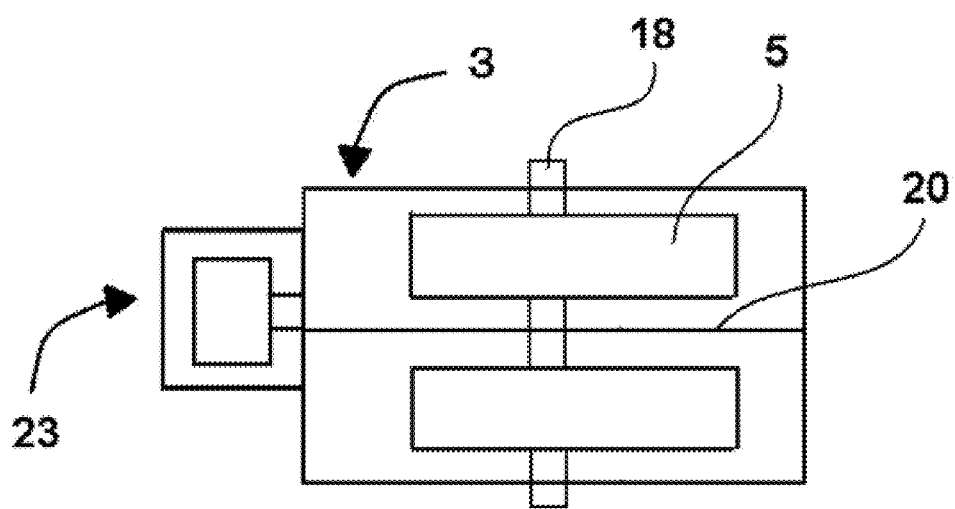
FIG. 6 is a top view of the apparatus according to Embodiment 5 of the present invention.
Figure 7:
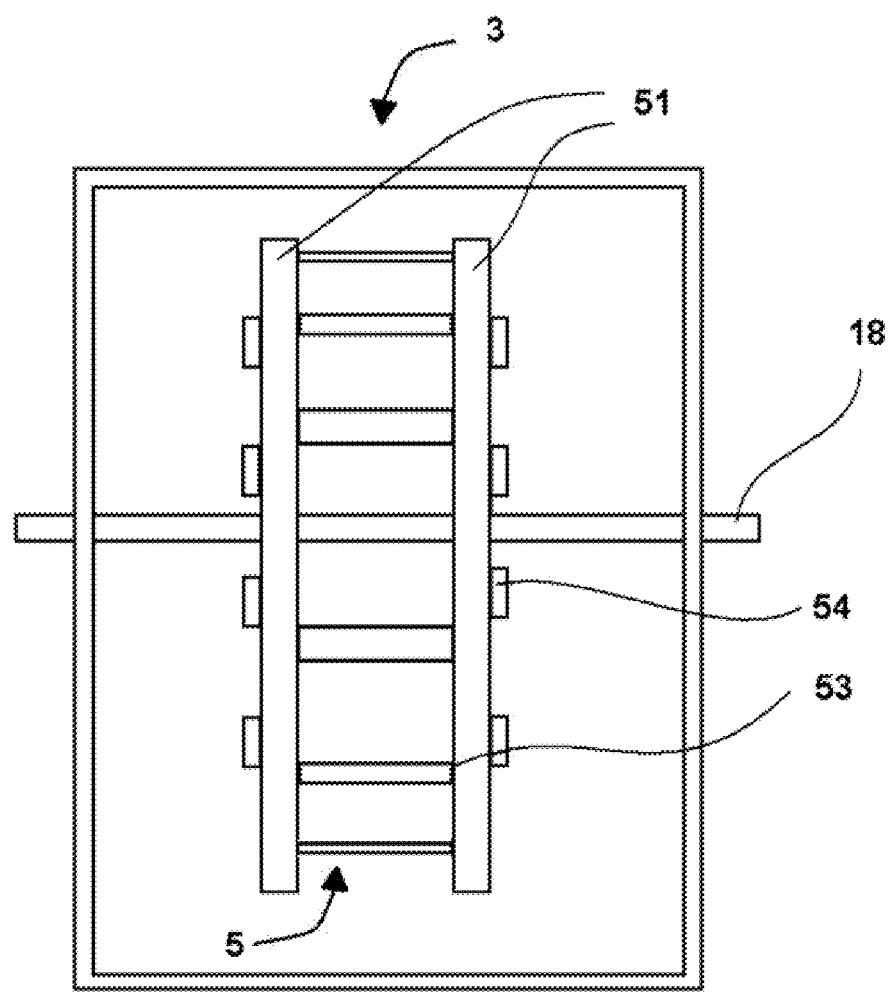
FIG. 7 is a diagram illustrating a rotary wheel 5 of the present invention.
Figure 8:
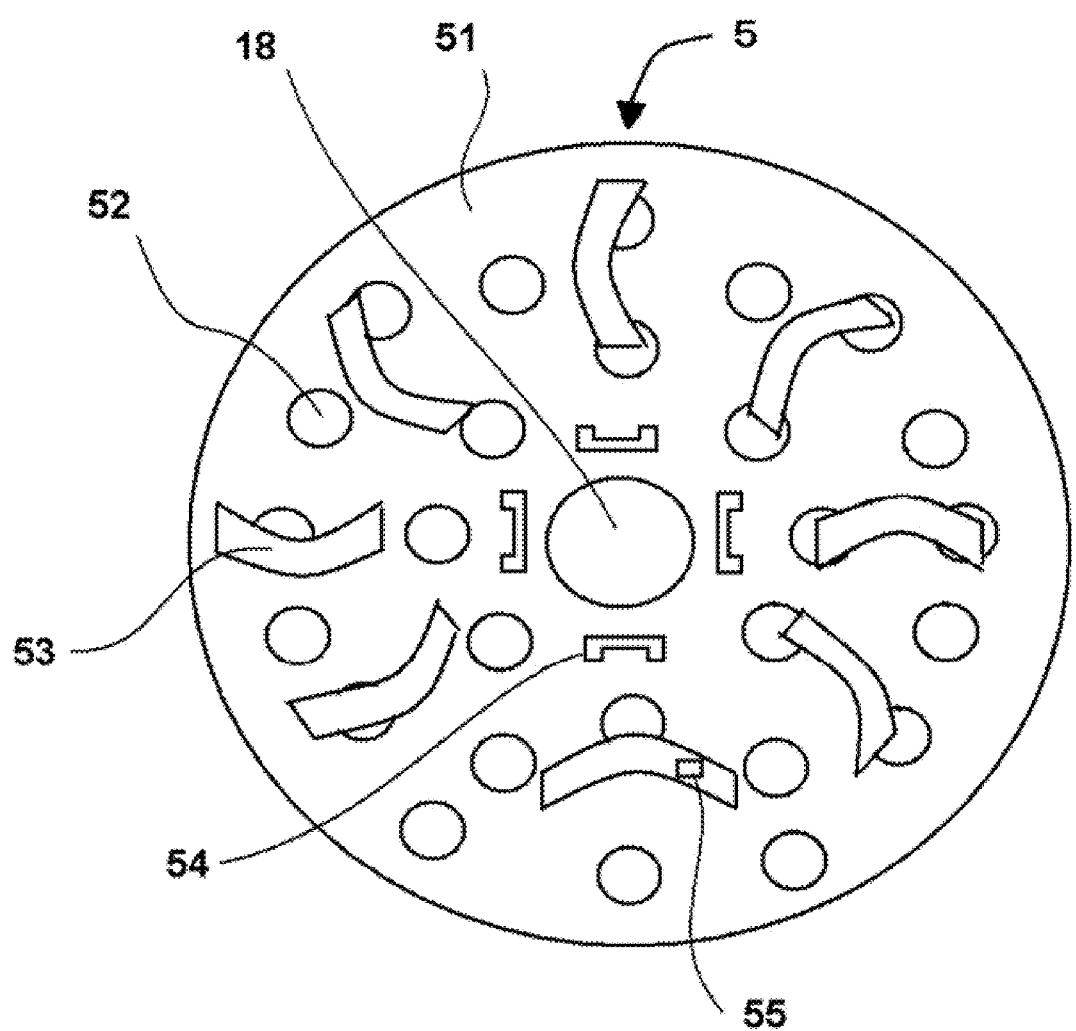
FIG. 8 is a diagram illustrating the rotary wheel 5 according to another embodiment of the present invention.
Figure 9:
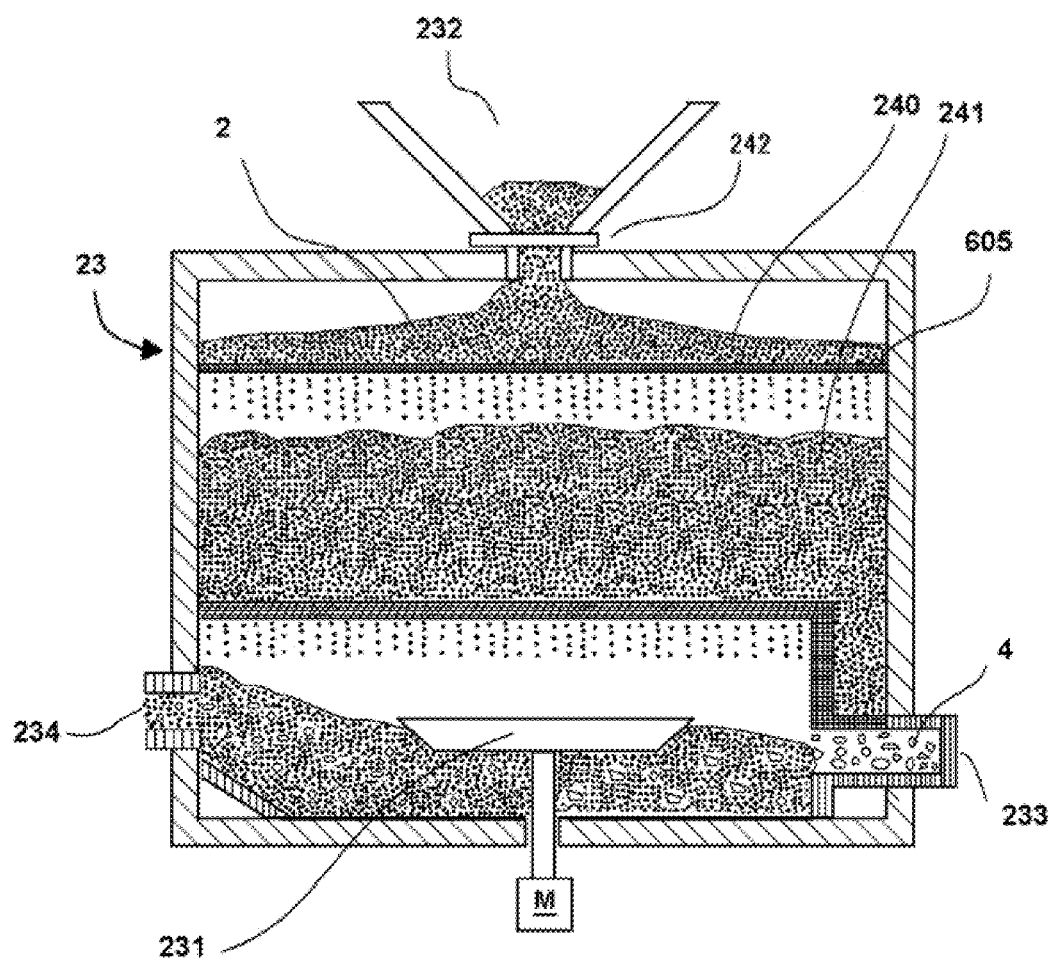
FIG. 9 is a cross-sectional view of a mixing vessel of the present invention.
Figure 10:
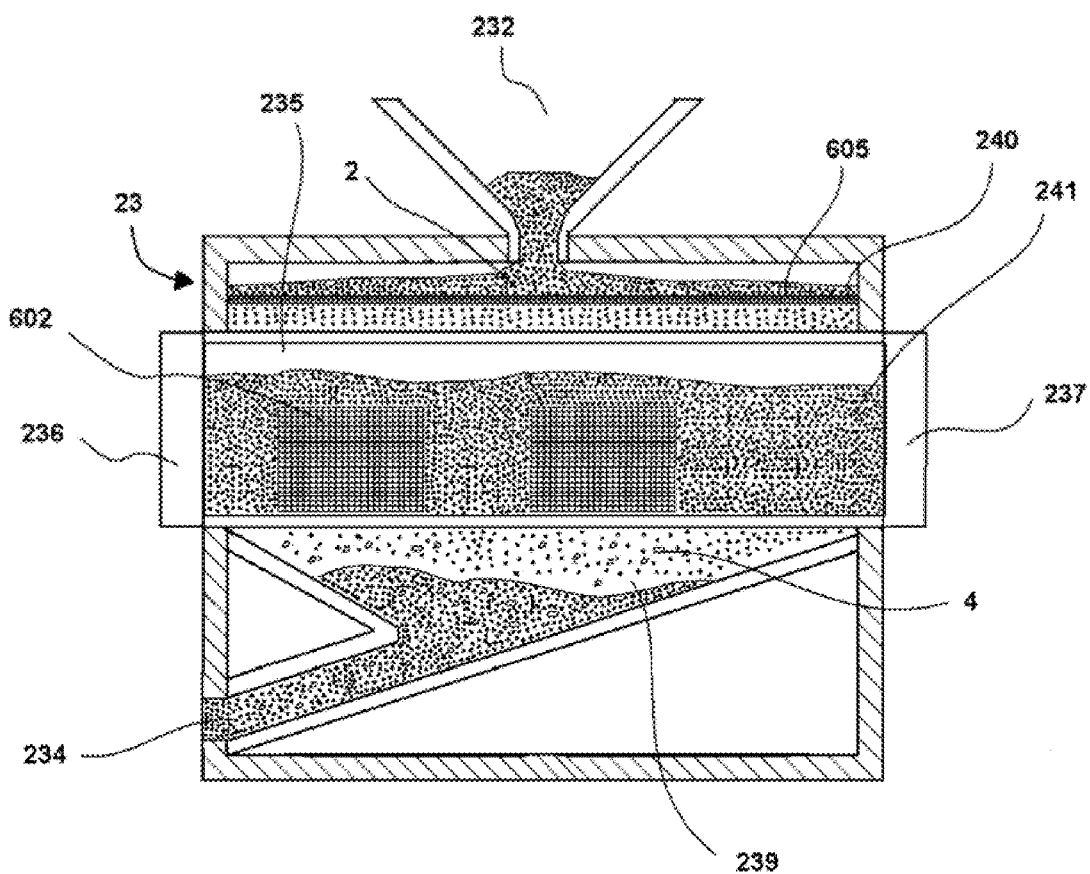
FIG. 10 is a cross-sectional view of the mixing vessel of the present invention.
Figure 11:
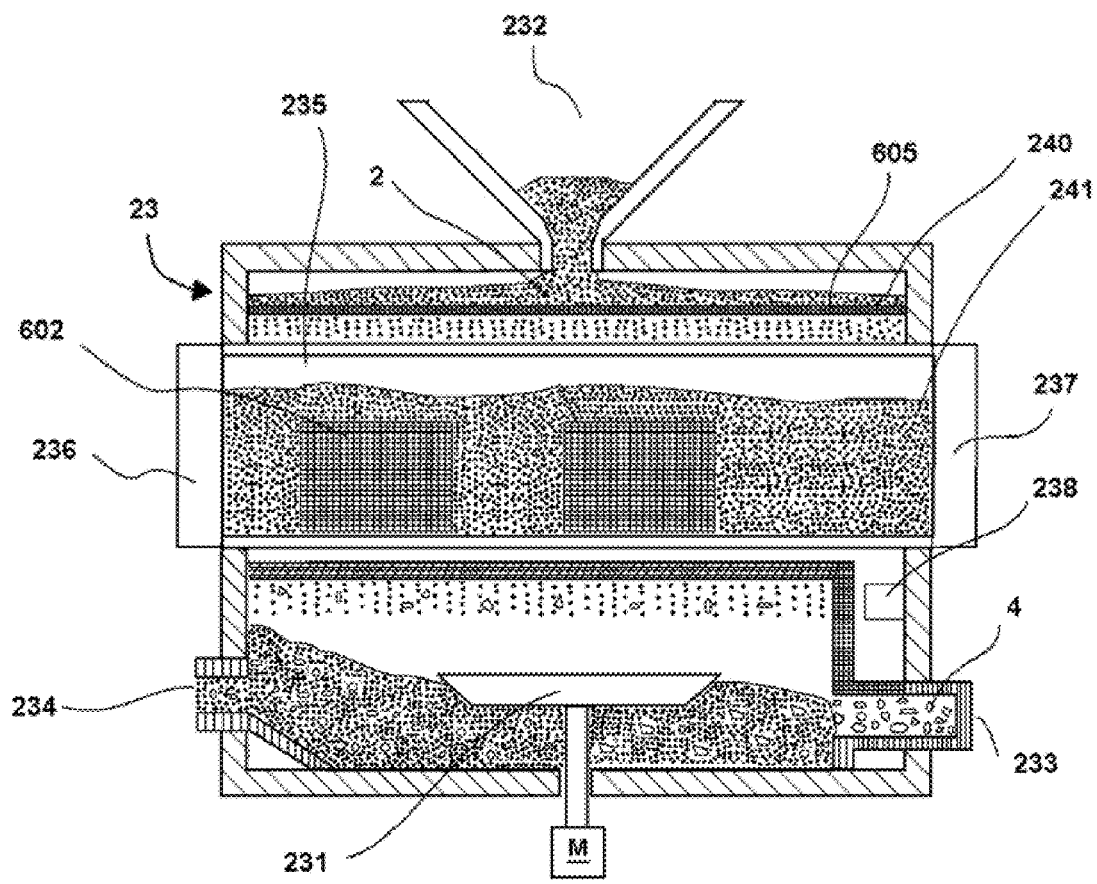
FIG. 11 is a cross-sectional view of the mixing vessel of the present invention.
Figure 12:
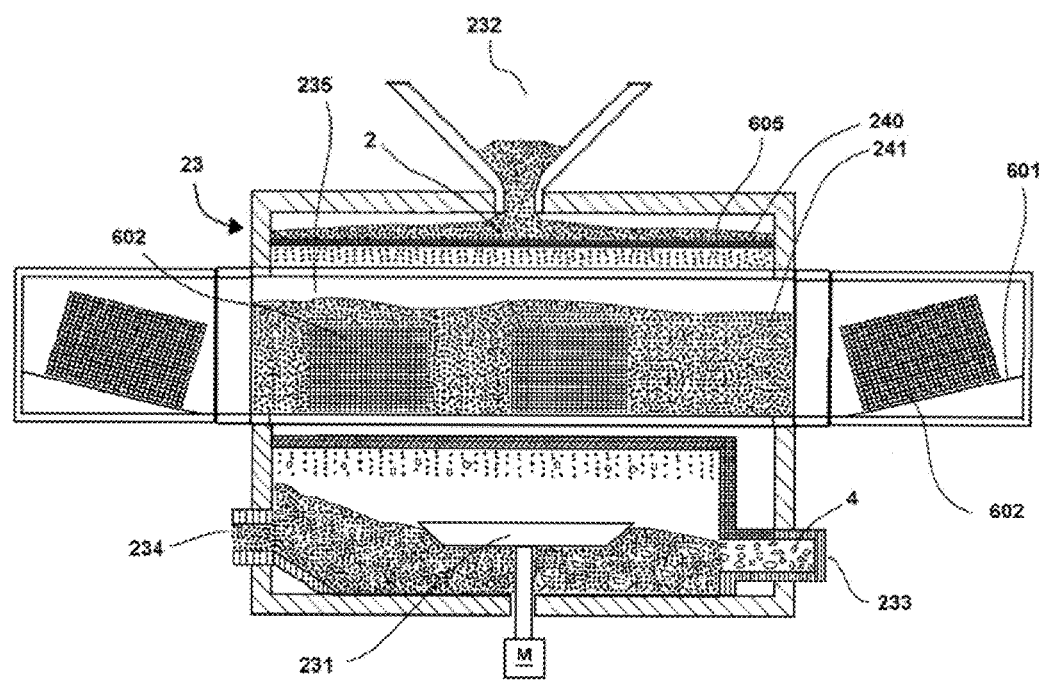
FIG. 12 is a cross-sectional view of a mixing vessel (with a basket transfer lane) of the present invention.
Figure 13:
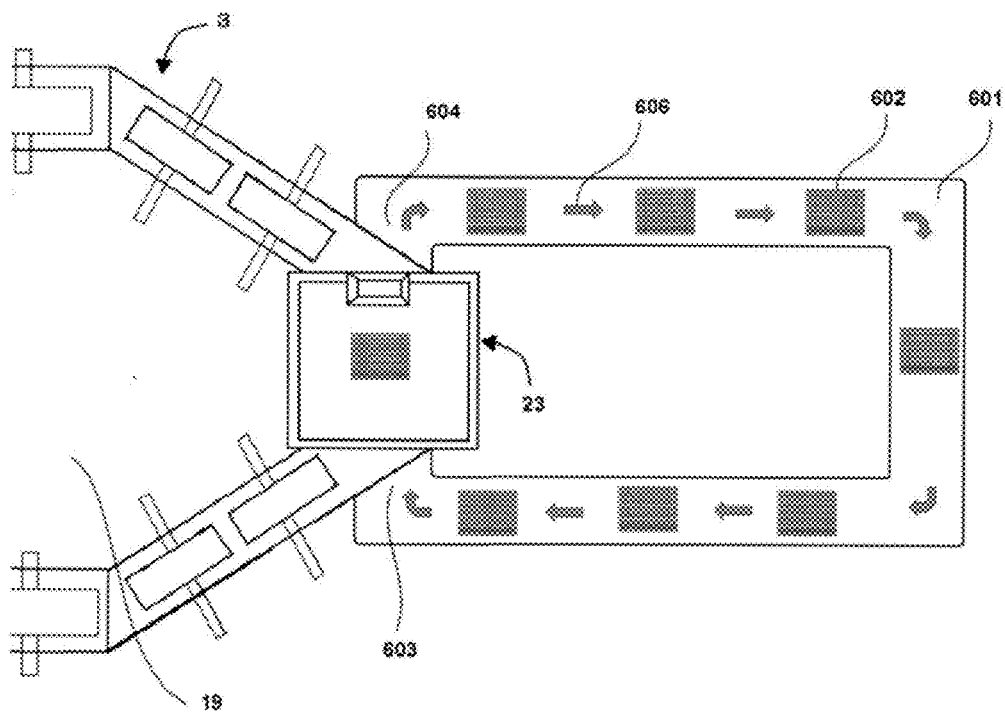
FIG. 13 is a schematic view illustrating the circulation of waste plastic/organic matter.
Figure 14:
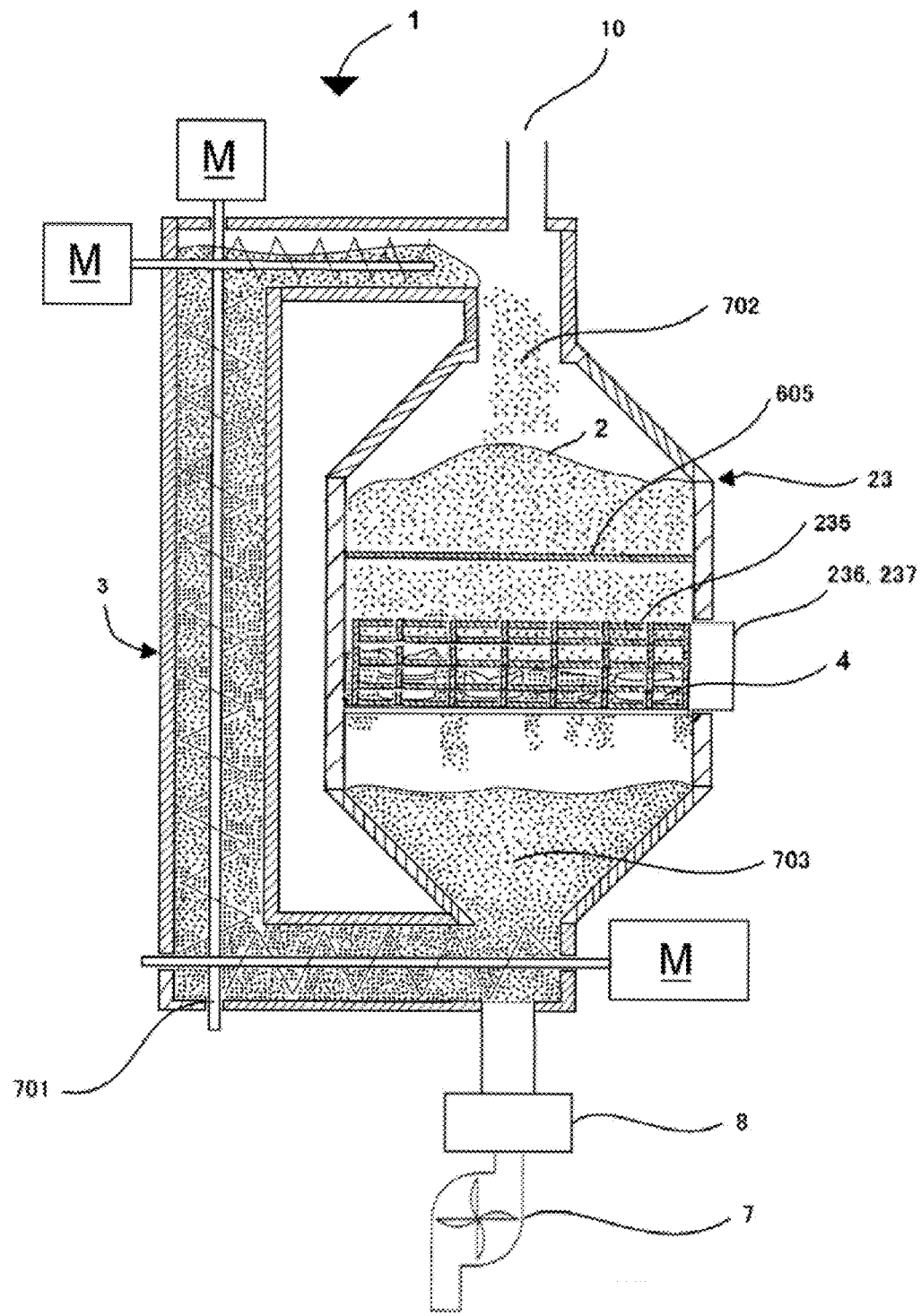
FIG. 14 is a diagram illustrating another embodiment of the present invention.
Figure 15:
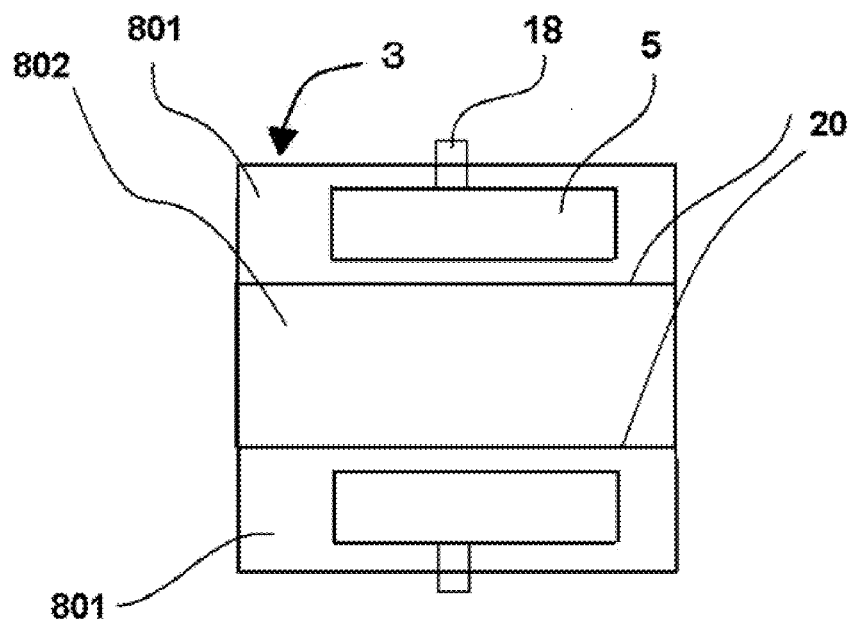
FIG. 15 is a top view of an apparatus of Embodiment 6 of the present invention.
Figure 16:
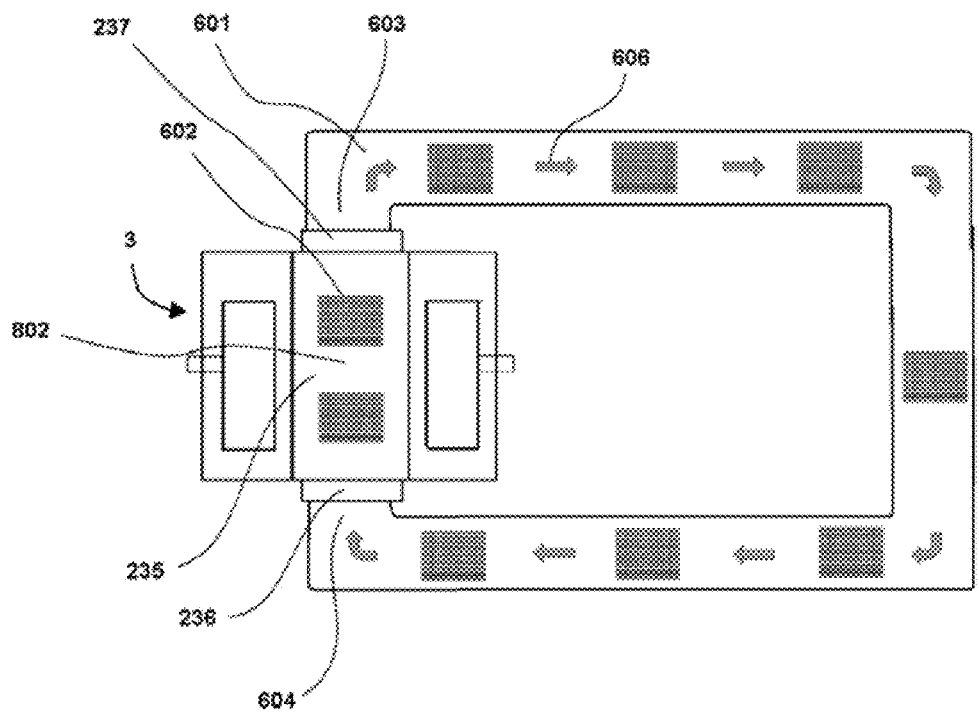
FIG. 16 is a top view of an apparatus (with a basket transfer lane) of Embodiment 6 of the present invention.
Figure 17:
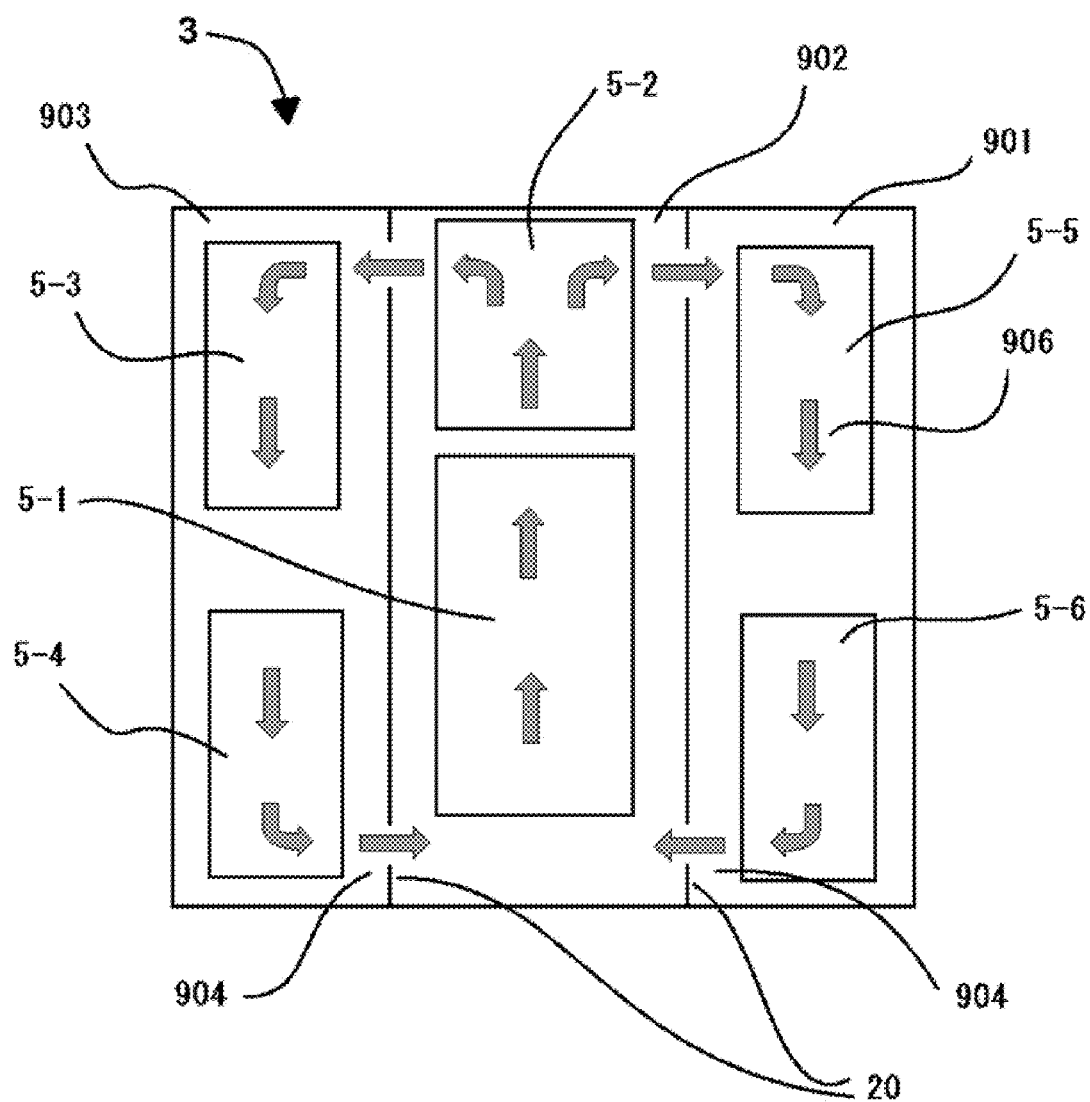
FIG. 17 is a top view of the apparatus of Embodiment 7 of the present invention.
Figure 18:
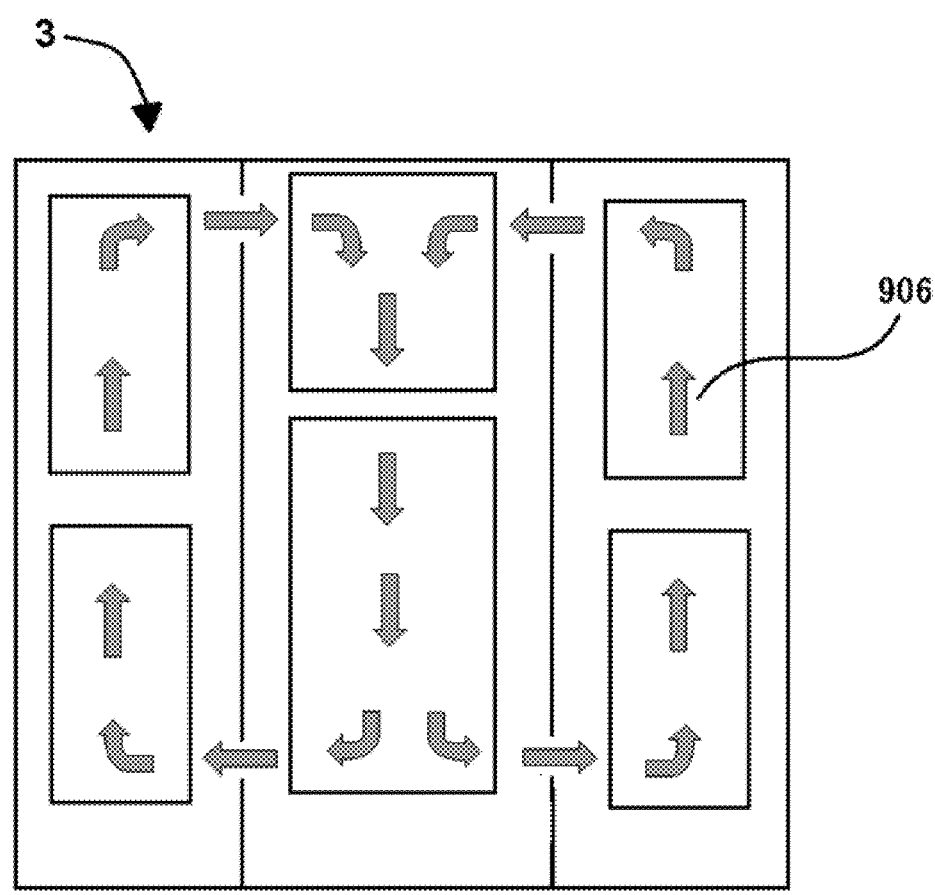
FIG. 18 is a top view of the apparatus of Embodiment 7 of the present invention (with catalyst circulation in the reverse direction).
Figure 19:
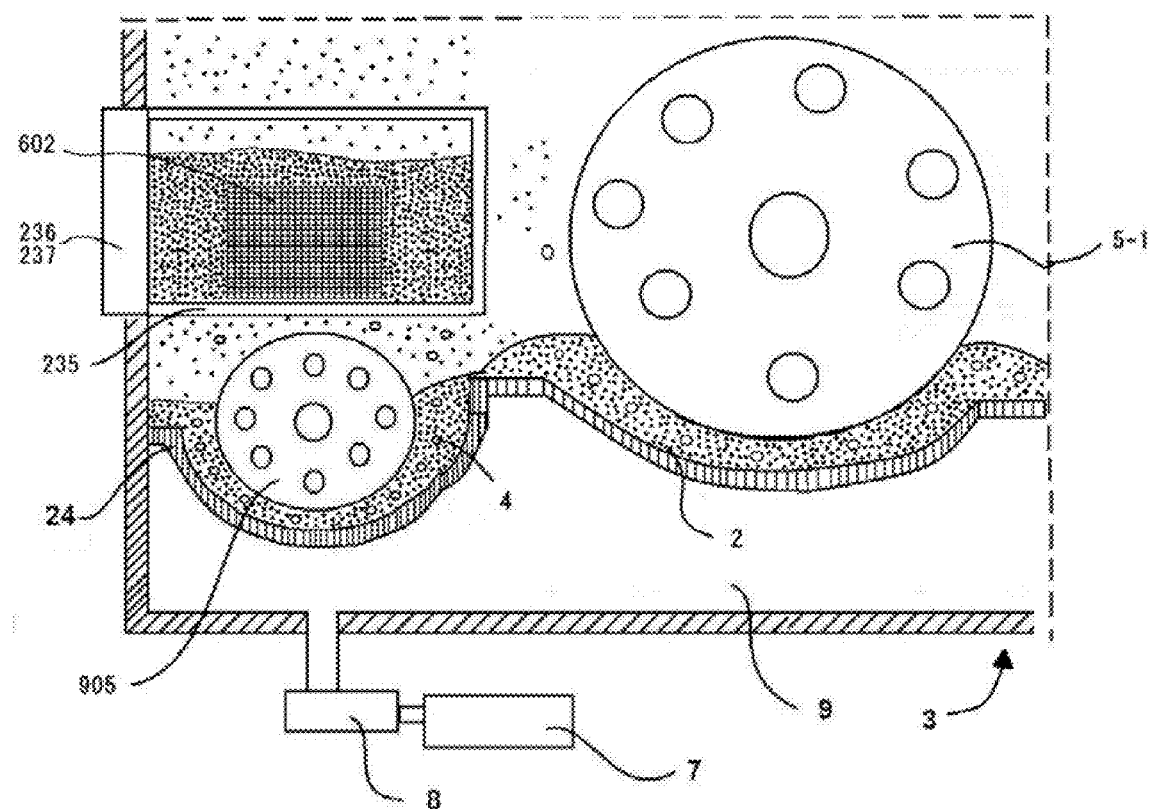
FIG. 19 is a cross-sectional view of the apparatus of Embodiment 7 of the present invention.
Figure 20:
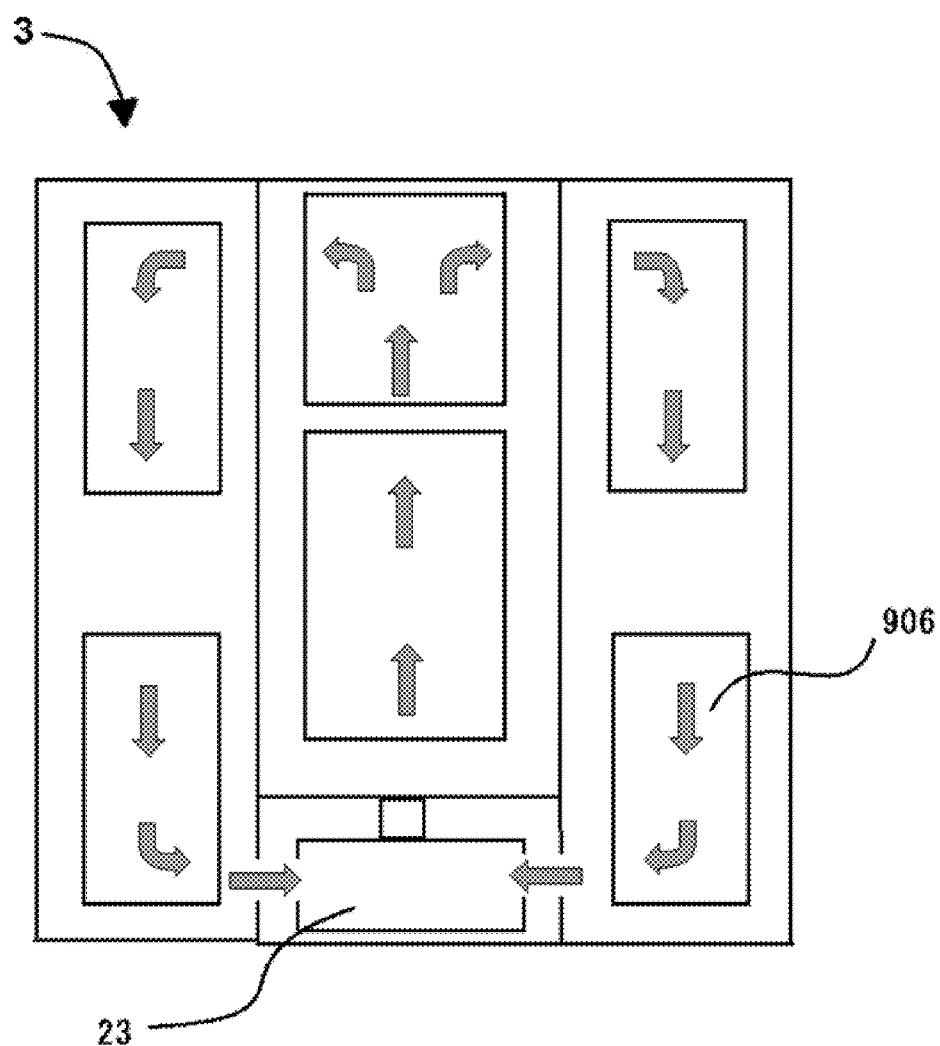
FIG. 20 is a top view of an apparatus (with a mixing vessel) of Embodiment 7 of the present invention.
Figure 21:
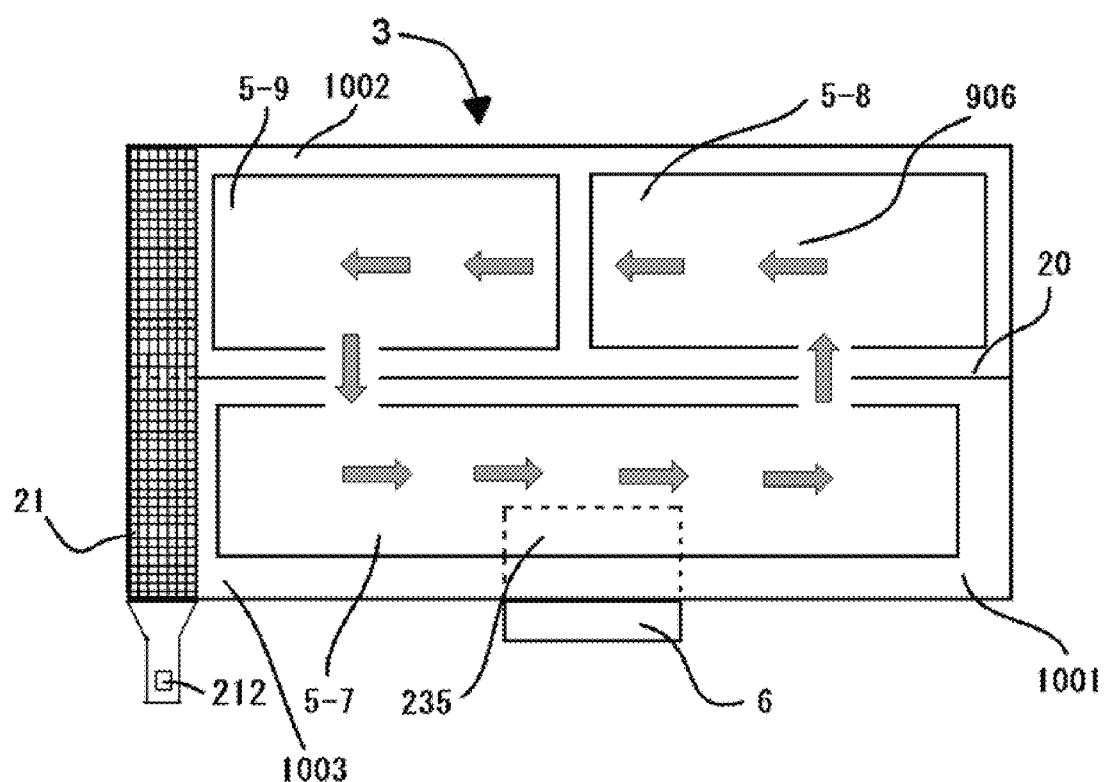
FIG. 21 is a top view of an apparatus of Embodiment 8 of the present invention.

1: catalyst-circulating type decomposition apparatus for waste plastic/organic matter
2: catalyst
3: circulation vessel
4: waste plastic/organic matter (waste plastic and/or organic matter)
5: rotary wheel
5-1: rotary wheel
5-2: rotary wheel
5-3: rotary wheel
5-4: rotary wheel
5-5: rotary wheel
5-6: rotary wheel
5-7: rotary wheel
5-8: rotary wheel
5-9: rotary wheel
6: slot
7: ventilation blower
8: heating means
9: ventilation chamber
10: exhaust port
11: first section
12: second section
13: third section
14: fourth section
15: fifth section
16: sixth section
17: paddle
18: rotation axis
19: area in each section
20: partition wall
21: means for separating/recovering metals and/or inorganic matter
22: a slot 22 for taking out a metal/inorganic matter
23: mixing vessel
24: air-permeable bottom material
25: downstream end of the final section
51: single wheel
52: hole
53: agitation blade
54: auxiliary propeller
55: projection
211: wire net having such a mesh that the maximum size of the catalyst 2 can pass
212: pocket
231: agitation means
232: catalyst-introduction port
233: introduction port for waste plastic/organic matter
234: connection tube
235: one or two or more basket storage areas
236: transport inlet
237: transport outlet
238: means for supplying a carrier gas
239: chute
240: first catalyst-retaining area
241: second catalyst-retaining area
242: valve
601: basket transfer lane
602: basket
603: upstream end of the basket transfer lane
604: downstream end of the basket transfer lane
605: net for controlling a catalyst amount
606: flow of basket transfer
701: means for circulation and/or agitation
702: upstream end
703: downstream end
801: both end areas
802: middle area
901: right area
902: middle area
903: left area
904: downstream end
905: means for auxiliary agitation
906: flow of a catalyst and/or waste plastic/organic matter
1001: forward area
1002: backward area
1003: downstream end

The invention claimed is:

1. A catalyst-circulating type decomposition apparatus for plastic/organic matter, comprising:
   a circulation vessel in which a catalyst is circulated;
   at least one rotary wheel installed in the circulation vessel and provided for circulating and/or agitating the plastic and/or organic matter together with the catalyst,
   the plastic and/or organic matter are/is circulated together with the catalyst in the circulation vessel,
   wherein the circulation vessel is divided into three areas, a right area, a left area, and a middle area, by two partition walls; and
   each of the three areas has said at least one rotary wheel.

2. The catalyst-circulating type decomposition apparatus for plastic/organic matter according to claim 1, wherein the rotary wheel is constructed so that a wheel is arranged on a rotation axis which is revolved by a driving source and the rotation axis passes through the circulation vessel.

3. The catalyst-circulating type decomposition apparatus for plastic/organic matter according to claim 2, wherein the wheel is provided with an agitation blade.

4. The catalyst-circulating type decomposition apparatus for plastic/organic matter according to claim 1, wherein:
   the at least one rotary wheel arranged on the middle area transfers the plastic and/or organic matter together with the catalyst to the right area and/or the left area;
   the at least one rotary wheel arranged on the right area and/or the left area transfers the plastic and/or organic matter together with the catalyst to the middle area; and
   the plastic and/or organic matter together with the catalyst are/is circulated in the circulation vessel.

5. The catalyst-circulating type decomposition apparatus for plastic/organic matter according to claim 1, wherein
the at least one rotary wheel arranged on the right area and/or the left area is located higher than the at least one rotary wheel arranged on the middle area; and
the catalyst after the completion of the circulation is dropped from a downstream end of the right area and/or the left area to newly supplied plastic and/or organic matter in the circulation vessel.

6. The catalyst-circulating type decomposition apparatus for plastic/organic matter according to claim 1, wherein a mixing vessel is connected to the circulation vessel or introduced into the circulation vessel.

7. The catalyst-circulating type decomposition apparatus for plastic/organic matter according to claim 6, wherein:
the mixing vessel includes
agitating means for agitating the plastic and/or organic matter,
an introduction port for introducing the plastic and/or organic matter into the mixing vessel, and
one or two or more catalyst-retaining areas for retaining the catalyst after the completion of circulation;
the catalyst after the completion of the circulation in the catalyst-retaining area is dropped to the plastic and/or organic matter;
the plastic and/or organic matter are/is brought into contact with the catalyst; and
the catalyst and the plastic and/or organic matter are transferred to the first area.

8. The catalyst-circulating type decomposition apparatus for plastic/organic matter according to claim 6, wherein:
the mixing vessel includes
one or two or more catalyst-retaining areas for retaining the catalyst after the completion of circulation,
one or two or more basket storage areas for housing the plastic and/or organic matter,
a transport inlet for carrying a basket into the mixing vessel, and
a transport outlet for carrying the basket out of the mixing vessel;
a basket containing the plastic and/or organic matter is carried into the basket storage area in the mixing vessel through the transport inlet;
the catalyst, after the completion of the circulation in the catalyst-retaining area, is dropped to the basket storage area;
the plastic and/or organic matter are/is brought into contact with the catalyst; and
the catalyst is then transferred to the first area.

9. The catalyst-circulating type decomposition apparatus for plastic/organic matter according to claim 8, wherein:
the mixing vessel further includes a basket transfer lane for transferring a plurality of baskets into the mixing vessel; and
one or two or more baskets are carried out of the mixing vessel through the transport outlet and simultaneously next one or two or more baskets are carried into the mixing vessel through the transport inlet.

10. The catalyst-circulating type decomposition apparatus for plastic/organic matter according to claim 9, wherein:
a downstream end of the basket transfer lane is connected to an upstream end of the basket transfer lane through the mixing vessel; and
additional plastic and/or organic matter to be newly processed are/is charged into the basket being carried out and the basket is then carried into the mixing vessel again.

11. The catalyst-circulating type decomposition apparatus for plastic/organic matter according to claim 6, wherein, in the mixing vessel, a carrier gas is supplied from a bottom and/or side of the mixing vessel to fill the mixing vessel with the catalyst.

12. The catalyst-circulating type decomposition apparatus for plastic/organic matter according to claim 1, further comprising one or more of the following means:
(1) inorganic/metallic catalyst treatment means;
(2) carrier gas supply means;
(3) cyclone dust collection means;
(4) dust collection means with a filter;
(5) heat exchange means;
(6) preheater means;
(7) exhaust means;
(8) cooling means;
(9) heat recovery means;
(10) HCl continuous measurement means;
(11) CO continuous measurement means;
(12) alarm means; and
(13) lime neutralization treatment means.

13. The decomposition apparatus of claim 1, wherein the catalyst is titanium oxide granules having titanium oxide as an active ingredient.

14. The decomposition apparatus according to claim 13, wherein titanium oxide as the active ingredient of the titanium oxide granules has the following characteristics:
(1) the granules are almost spherically shaped; and
(2) 70% or more of the entire granules each have a particle size of 0.15 to 1.0 mm.

15. The decomposition apparatus according to claim 14, wherein the titanium oxide granules comprise a mixture of titanium oxide as the active ingredient and at least any one selected from the following components:
(1) aluminum oxide; and
(2) silicon oxide.

16. A catalyst-circulating type decomposition apparatus for plastic/organic matter, comprising:
a circulation vessel in which a catalyst is circulated;
at least one rotary wheel installed in the circulation vessel and provided for circulating and/or agitating the plastic and/or organic matter together with the catalyst,
the plastic and/or organic matter are/is circulated together with the catalyst in the circulation vessel,
wherein:
the circulation vessel is divided into two areas, a forward area and a backward area, by one partition wall;
one rotary wheel is arranged on the forward area and two rotary wheels are arranged on the backward area;
the rotary wheel arranged on the forward area transfers the plastic and/or organic matter to the backward area;
the rotary wheels arranged on the backward area transfer the plastic and/or organic matter together with the catalyst to the forward area; and
the plastic and/or organic matter are/is circulated together with the catalyst in the circulation vessel.

17. A catalyst-circulating type decomposition apparatus for plastic/organic matter, comprising:
a circulation vessel in which a catalyst is circulated;
at least one rotary wheel installed in the circulation vessel and provided for circulating and/or agitating the plastic and/or organic matter together with the catalyst,
the plastic and/or organic matter are/is circulated together with the catalyst in the circulation vessel, wherein the circulation vessel is divided into three areas by two partition walls and said at least one rotary wheel is arranged on each of both end areas.

18. The catalyst-circulating type decomposition apparatus for plastic/organic matter according to claim 17, wherein the circulation vessel includes
a transport inlet for carrying a basket into the circulation vessel,
a transport outlet for carrying the basket out of the circulation vessel, and
one or two or more basket storage areas for housing the plastic and/or organic matter in the middle area of the circulation vessel.

19. The catalyst-circulating type decomposition apparatus for plastic/organic matter according to claim 18, wherein:
the circulation vessel further includes a basket transfer lane for carrying a plurality of baskets into the circulation vessel; and
one or two or more baskets are carried out of the circulation vessel through the transport outlet and simultaneously next one or two or more baskets are carried into the circulation vessel through the transport inlet.

20. The catalyst-circulating type decomposition apparatus for plastic/organic matter according to claim 19, wherein:
a downstream end of the basket transfer lane is connected to an upstream end of the basket transfer lane through the circulation vessel; and
additional plastic and/or organic matter to be newly processed are/is charged into the basket being carried out and the basket is then carried into the circulation vessel again.

21. A catalyst-circulating type decomposition apparatus for plastic/organic matter, comprising:
a circulation vessel in which a catalyst is circulated;
at least one rotary wheel installed in the circulation vessel and provided for circulating and/or agitating the plastic and/or organic matter together with the catalyst,
the plastic and/or organic matter are/is circulated together with the catalyst in the circulation vessel,
wherein:
the circulation vessel is divided into two or more sections and first to final sections are connected to one another;
a downstream end of the final section is connected to an upstream end of the first section; and
said at least one rotary wheel is arranged on each of the sections.

22. The catalyst-circulating type decomposition apparatus for plastic/organic matter according to claim 21, wherein:
the rotary wheel arranged on the final section is located higher than the rotary wheel arranged on a previous section being connected to the final section; and
the catalyst after the completion of the circulation is dropped from the downstream end of the final section to newly supplied plastic and/or organic matter in the circulation vessel.

23. A catalyst-circulating type decomposition apparatus for plastic/organic matter, comprising:
a circulation vessel in which a catalyst is circulated;
at least one rotary wheel installed in the circulation vessel and provided for circulating and/or agitating the plastic and/or organic matter together with the catalyst,
the plastic and/or organic matter are/is circulated together with the catalyst in the circulation vessel,
wherein:
the circulation vessel is divided into two or more sections and first to final sections are connected to one another;
a downstream end of the final section is connected to an upstream end of the first section through a mixing vessel; and
said at least one rotary wheel is arranged on each of the sections.

24. The catalyst-circulating type decomposition apparatus for plastic/organic matter according to claim 23, wherein:
the rotary wheel arranged on the final section is located higher than the rotary wheel arranged on a previous section being connected to the final section; and
the catalyst after the completion of the circulation is dropped from the downstream end of the final section to newly supplied plastic and/or organic matter in the mixing vessel.

25. A catalyst-circulating type decomposition apparatus for plastic/organic matter, comprising:
a circulation vessel in which a catalyst is circulated;
a mixing vessel for mixing the catalyst with the plastic and/or organic matter;
means for circulating and/or agitating the plastic and/or organic matter together with the catalyst (means for circulation and/or agitation) in the circulation vessel;
means for agitating the plastic and/or organic matter in the mixing vessel;
an introduction port in the mixing vessel for introducing the plastic and/or organic matter into the mixing vessel; and
one or two or more catalyst-retaining areas in the mixing vessel for retaining the catalyst after the completion of circulation,
wherein:
the catalyst after the completion of the circulation in the catalyst-retaining area is dropped to the plastic and/or organic matter;
the plastic and/or organic matter are/is brought into contact with the catalyst; and
the catalyst and the plastic and/or organic matter are then transferred into the circulation vessel.

26. The catalyst-circulating type decomposition apparatus for plastic/organic matter according to claim 25, wherein:
the mixing vessel further includes
one or two or more basket storage areas for housing the plastic and/or organic matter;
a transport inlet for carrying a basket into the mixing vessel; and
a transport outlet for carrying the basket out of the mixing vessel;
a basket containing the plastic and/or organic matter is carried into the basket storage area in the mixing vessel through the transport inlet;
the catalyst after the completion of the circulation in the catalyst-retaining area is dropped to the plastic and/or organic matter;
the plastic and/or organic matter are/is brought into contact with the catalyst; and
the catalyst is then transferred into the circulation vessel.

27. The catalyst-circulating type decomposition apparatus for plastic/organic matter according to claim 25, wherein:
the mixing vessel further includes a basket transfer lane for carrying a plurality of baskets into the mixing vessel; and
one or two or more baskets are carried out of the mixing vessel through the transport outlet and simultaneously next one or two or more baskets are carried into the mixing vessel through the transport inlet.

28. The catalyst-circulating type decomposition apparatus for plastic/organic matter according to claim 27, wherein:
a downstream end of the basket transfer lane is connected to an upstream end of the basket transfer lane through the mixing vessel; and additional plastic and/or organic matter to be newly processed are/is charged into the basket being carried out and the basket is then transferred into the mixing vessel again.

29. A catalyst-circulating type decomposition apparatus for plastic/organic matter, comprising:
a circulation vessel in which a catalyst is circulated;
a mixing vessel for mixing the catalyst with the plastic and/or organic matter;
means for circulating and/or agitating the plastic and/or organic matter together with the catalyst (means for circulation and/or agitation) in the circulation vessel;
one or two or more basket storage areas for housing the plastic and/or organic matter in the mixing vessel;
a transport inlet in the mixing vessel for carrying a basket into the mixing vessel; and
a transport outlet in the mixing vessel for carrying the basket out of the mixing vessel; and
one or two or more catalyst-retaining areas for retaining the catalyst after the completion of circulation,
wherein:
a basket containing the plastic and/or organic matter is carried into the basket storage area in the mixing vessel through the transport inlet;
the catalyst after the completion of the circulation in the catalyst-retaining area is dropped to the plastic and/or organic matter;
the plastic and/or organic matter are/is brought into contact with the catalyst; and
the catalyst is then transferred into the circulation vessel.

30. The catalyst-circulating type decomposition apparatus for plastic/organic matter according to claim 29, wherein:
the mixing vessel further includes
agitating means for agitating the plastic and/or organic matter, and
an introduction port for introducing the plastic and/or organic matter into the mixing vessel;
the catalyst after the completion of the circulation in the catalyst-retaining area is dropped to the plastic and/or organic matter;
the plastic and/or organic matter are/is brought into contact with the catalyst; and
the catalyst and the plastic and/or organic matter are transferred to the circulation vessel.

31. A catalyst-circulating type decomposition apparatus for plastic/organic matter, comprising:
a circulation vessel in which a catalyst is circulated;
a mixing vessel in which the catalyst is dropped from a downstream end to an upstream end;
means for circulating and/or agitating the catalyst (means for circulation and/or agitation) in the circulation vessel;
one or two or more basket storage areas in the mixing vessel for housing the plastic and/or organic matter;
a transport inlet in the mixing vessel for carrying a basket into the mixing vessel; and
a transport outlet in the mixing vessel for carrying the basket out of the mixing vessel,
wherein:
a basket containing the plastic and/or organic matter is carried into the basket storage area in the mixing vessel through the transport inlet;
the catalyst after the completion of the circulation is dropped to the plastic and/or organic matter;
the plastic and/or organic matter are/is brought into contact with the catalyst; and
the catalyst is then transferred into the circulation vessel.

32. The catalyst-circulating type decomposition apparatus for plastic/organic matter according to claim 31, wherein:
the mixing vessel further includes a basket transfer lane for carrying a plurality of baskets into the mixing vessel; and
one or two or more baskets are carried out of the mixing vessel through the transport outlet and simultaneously next one or two or more baskets are carried into the mixing vessel through the transport inlet.

33. The catalyst-circulating type decomposition apparatus for plastic/organic matter according to claim 32, wherein:
a downstream end of the basket transfer lane is connected to an upstream end of the basket transfer lane through the mixing vessel; and
additional plastic and/or organic matter to be newly processed are/is charged into the basket being carried out and the basket is then carried into the mixing vessel again.

34. A catalyst-circulating type decomposition apparatus for plastic/organic matter, comprising:
a circulation vessel in which a catalyst is circulated;
at least one rotary wheel installed in the circulation vessel and provided for circulating and/or agitating the plastic and/or organic matter together with the catalyst,
the plastic and/or organic matter are/is circulated together with the catalyst in the circulation vessel,
wherein, in the circulation vessel, a carrier gas is capable of being directly supplied from a mesh of a wire net on the bottom of the circulation vessel to an inside of the catalyst while being uniformly distributed.

* * * * *